(12) United States Patent
Haag et al.

(10) Patent No.: US 7,930,149 B2
(45) Date of Patent: Apr. 19, 2011

(54) VERSIONING OF ELEMENTS IN A CONFIGURATION MODEL

(75) Inventors: Albert Haag, Bad Duerkheim (DE); Andreas Kraemer, Berlin (DE); Andreas Steiner, Leimen (DE); Bernhard Teltscher, Speyer (DE); Stein Wanvik, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 722 days.

(21) Appl. No.: 10/742,506

(22) Filed: Dec. 19, 2003

(65) Prior Publication Data

US 2005/0137731 A1 Jun. 23, 2005

(51) Int. Cl.
*G06F 17/50* (2006.01)
(52) U.S. Cl. .............................. 703/1; 705/27; 700/97
(58) Field of Classification Search .................... 703/1, 6
See application file for complete search history.

(56) References Cited

U.S. PATENT DOCUMENTS

| | | | | |
|---|---|---|---|---|
| 4,459,663 | A | 7/1984 | Dye .................................. | 705/29 |
| 4,875,162 | A | 10/1989 | Ferriter et al. .................. | 705/29 |
| 5,099,431 | A | 3/1992 | Natarajan ...................... | 700/105 |
| 5,111,413 | A * | 5/1992 | Lazansky et al. ............... | 703/14 |
| 5,182,705 | A | 1/1993 | Barr et al. ........................ | 705/11 |
| 5,191,534 | A | 3/1993 | Orr et al. ........................ | 700/105 |
| 5,260,866 | A * | 11/1993 | Lisinski et al. .................. | 705/29 |
| 5,311,424 | A | 5/1994 | Mukherjee et al. ............. | 705/29 |
| 5,335,346 | A | 8/1994 | Fabbio ........................... | 711/163 |
| 5,359,523 | A * | 10/1994 | Talbott et al. ................... | 700/97 |
| 5,381,332 | A * | 1/1995 | Wood .............................. | 705/8 |
| 5,418,945 | A | 5/1995 | Carter et al. .................. | 395/600 |
| 5,434,791 | A | 7/1995 | Koko et al. | |
| 5,442,782 | A | 8/1995 | Malatesta et al. .............. | 395/600 |
| 5,499,357 | A | 3/1996 | Sonty et al. ..................... | 710/104 |
| 5,537,524 | A * | 7/1996 | Aprile .............................. | 345/440 |
| 5,655,085 | A | 8/1997 | Ryan et al. ......................... | 705/4 |
| 5,694,598 | A | 12/1997 | Durand et al. ................. | 395/614 |
| 5,703,938 | A | 12/1997 | Lucas et al. ............... | 379/112.05 |

(Continued)

FOREIGN PATENT DOCUMENTS

CA 2391829 6/2001

(Continued)

OTHER PUBLICATIONS

Syrjanen, Tommi, "Version Spaces and Rule-Based Configuration Management", IJCAI'01 Workshop on Configuration, 2001.*

(Continued)

*Primary Examiner* — Mary C Jacob
(74) *Attorney, Agent, or Firm* — Fish & Richardson P.C.

(57) ABSTRACT

Methods and apparatus, including computer program products, for a multi-purpose configuration model. A computer program product for defining a configuration model for a configurable product includes instructions operable to cause a programmable processor to receive a first input, and define, based on the first input, a first version of a first subcomponent to be used in the configuration model, the first version including information that describes the configurable product. The computer program product includes instructions to receive a second input, and define, based on the second input, a second version of the first subcomponent to be used in the configuration model, the second version including information that describes the configurable product. The computer program product designates one of the first or second versions to be an active version, and designates the other to be an inactive version. The computer program product also includes instructions to define a first component based at least in part on the active version.

20 Claims, 21 Drawing Sheets

U.S. PATENT DOCUMENTS

| | | | |
|---|---|---|---|
| 5,710,884 A | 1/1998 | Dedrick | 709/217 |
| 5,758,031 A | 5/1998 | De Silva | 706/47 |
| 5,765,142 A * | 6/1998 | Allred et al. | 705/26 |
| 5,799,293 A | 8/1998 | Kaepp | 706/45 |
| 5,815,395 A * | 9/1998 | Hart | 700/110 |
| 5,838,965 A | 11/1998 | Kavanagh et al. | 707/103 R |
| 5,859,972 A | 1/1999 | Subramaniam et al. | 709/203 |
| 5,911,139 A | 6/1999 | Jain et al. | 707/3 |
| 5,923,552 A * | 7/1999 | Brown et al. | 700/100 |
| 5,966,715 A | 10/1999 | Sweeney et al. | 707/203 |
| 5,984,511 A | 11/1999 | Vasey-Glandon et al. | 703/6 |
| 6,002,854 A | 12/1999 | Lynch et al. | |
| 6,002,941 A * | 12/1999 | Ablay et al. | 455/518 |
| 6,018,742 A | 1/2000 | Herbert, III | 707/102 |
| 6,029,195 A | 2/2000 | Herz | 725/116 |
| 6,032,147 A | 2/2000 | Williams et al. | 707/101 |
| 6,067,525 A | 5/2000 | Johnson et al. | 705/10 |
| 6,167,383 A * | 12/2000 | Henson | 705/26 |
| 6,216,108 B1 * | 4/2001 | LeVander | 705/7 |
| 6,226,650 B1 | 5/2001 | Mahajan et al. | 707/625 |
| 6,236,997 B1 | 5/2001 | Bodamer et al. | 707/1 |
| 6,247,128 B1 * | 6/2001 | Fisher et al. | 713/100 |
| 6,324,508 B1 * | 11/2001 | Finney | 704/246 |
| 6,324,647 B1 | 11/2001 | Bowman-Amuah | 726/23 |
| 6,330,598 B1 | 12/2001 | Beckwith et al. | 709/223 |
| 6,341,261 B1 | 1/2002 | Vasey-Glandon et al. | 703/6 |
| 6,405,132 B1 | 6/2002 | Breed et al. | 701/301 |
| 6,477,517 B1 | 11/2002 | Limaiem et al. | 706/45 |
| 6,480,755 B1 | 11/2002 | Ootani et al. | 700/105 |
| 6,487,594 B1 | 11/2002 | Bahlmann | 709/225 |
| 6,487,713 B1 * | 11/2002 | Cohen et al. | 717/105 |
| 6,529,948 B1 | 3/2003 | Bowman-Amuah | 709/217 |
| 6,567,818 B1 | 5/2003 | Frey et al. | 707/694 |
| 6,609,108 B1 * | 8/2003 | Pulliam et al. | 705/27 |
| 6,629,065 B1 * | 9/2003 | Gadh et al. | 703/1 |
| 6,711,456 B2 | 3/2004 | Yokomori et al. | 700/169 |
| 6,718,361 B1 | 4/2004 | Basani et al. | 709/201 |
| 6,725,257 B1 * | 4/2004 | Cansler et al. | 709/219 |
| 6,728,888 B2 * | 4/2004 | Ooki et al. | 726/7 |
| 6,738,682 B1 | 5/2004 | Pasadyn | 700/100 |
| 6,754,666 B1 | 6/2004 | Brookler et al. | 711/100 |
| 6,760,693 B1 | 7/2004 | Singh et al. | 703/8 |
| 6,768,944 B2 | 7/2004 | Breed et al. | 701/301 |
| 6,778,864 B1 | 8/2004 | Bugli et al. | 700/32 |
| 6,810,401 B1 * | 10/2004 | Thompson et al. | 707/101 |
| 6,820,082 B1 * | 11/2004 | Cook et al. | 707/9 |
| 6,842,881 B2 | 1/2005 | Croke et al. | 716/1 |
| 6,857,123 B1 | 2/2005 | Nuxoll et al. | 719/316 |
| 6,879,976 B1 | 4/2005 | Brookler et al. | 707/3 |
| 6,883,136 B1 | 4/2005 | Weinberg et al. | 715/205 |
| 6,895,408 B1 | 5/2005 | Kavantzas | 707/10 |
| 6,915,287 B1 | 7/2005 | Felsted et al. | 707/1 |
| 6,959,268 B1 | 10/2005 | Myers, Jr. et al. | 703/6 |
| 6,961,687 B1 | 11/2005 | Myers, Jr. et al. | 703/6 |
| 6,988,014 B2 | 1/2006 | Haag et al. | |
| 7,031,787 B2 | 4/2006 | Kalthoff et al. | |
| 7,096,164 B1 * | 8/2006 | Musharbash | 703/1 |
| 7,103,605 B1 | 9/2006 | Hazi et al. | 705/26 |
| 7,110,988 B1 | 9/2006 | Allemann et al. | 706/7 |
| 7,165,041 B1 | 1/2007 | Guheen et al. | 705/26 |
| 7,315,826 B1 | 1/2008 | Guheen et al. | 705/7 |
| 2001/0034628 A1 | 10/2001 | Eder | 705/7 |
| 2002/0038206 A1 | 3/2002 | Dori | 703/22 |
| 2002/0065892 A1 | 5/2002 | Malik | 709/206 |
| 2002/0073114 A1 | 6/2002 | Nicastro et al. | 705/7 |
| 2002/0087510 A1 | 7/2002 | Weinberg et al. | 707/1 |
| 2002/0095454 A1 | 7/2002 | Reed et al. | 709/201 |
| 2002/0099583 A1 | 7/2002 | Matusek et al. | 705/7 |
| 2002/0108099 A1 | 8/2002 | Paclat | 717/102 |
| 2002/0116417 A1 * | 8/2002 | Weinberg et al. | 715/212 |
| 2002/0124005 A1 * | 9/2002 | Matson et al. | 707/101 |
| 2002/0128904 A1 * | 9/2002 | Carruthers et al. | 705/14.43 |
| 2002/0156668 A1 * | 10/2002 | Morrow et al. | 705/8 |
| 2002/0156688 A1 * | 10/2002 | Horn et al. | 705/26 |
| 2002/0161778 A1 * | 10/2002 | Linstedt | 707/102 |
| 2002/0165960 A1 | 11/2002 | Chan | 709/225 |
| 2002/0173999 A1 * | 11/2002 | Griffor et al. | 705/7 |
| 2002/0184308 A1 * | 12/2002 | Levy et al. | 709/203 |
| 2002/0188484 A1 | 12/2002 | Grover et al. | 705/4 |
| 2002/0188537 A1 | 12/2002 | Leeds et al. | 705/35 |
| 2002/0194196 A1 * | 12/2002 | Weinberg et al. | 707/100 |
| 2003/0018878 A1 * | 1/2003 | Dorward et al. | 711/216 |
| 2003/0028519 A1 * | 2/2003 | Burgess | 717/175 |
| 2003/0090527 A1 | 5/2003 | Kamino | |
| 2003/0130749 A1 | 7/2003 | Haag et al. | |
| 2003/0135495 A1 * | 7/2003 | Vagnozzi | 707/103 |
| 2003/0182145 A1 | 9/2003 | Kalthoff et al. | |
| 2003/0182167 A1 | 9/2003 | Kalthoff et al. | |
| 2003/0191832 A1 * | 10/2003 | Satyavolu et al. | 709/223 |
| 2003/0204440 A1 * | 10/2003 | Koller et al. | 705/11 |
| 2003/0233347 A1 * | 12/2003 | Weinberg et al. | 707/4 |
| 2004/0012634 A1 | 1/2004 | Haag et al. | |
| 2004/0015408 A1 * | 1/2004 | Rauen, IV et al. | 705/26 |
| 2004/0059709 A1 * | 3/2004 | Farrands et al. | 705/8 |
| 2004/0128180 A1 | 7/2004 | Abel et al. | |
| 2004/0177002 A1 | 9/2004 | Abelow | 705/14 |
| 2004/0233232 A1 | 11/2004 | Iborra et al. | 715/700 |
| 2004/0249650 A1 | 12/2004 | Freedman et al. | 705/1 |
| 2005/0038551 A1 * | 2/2005 | Mazumder et al. | 700/166 |
| 2005/0060245 A1 | 3/2005 | Hoffman et al. | 705/28 |
| 2005/0102374 A1 | 5/2005 | Moragne et al. | 709/217 |
| 2005/0177716 A1 | 8/2005 | Ginter et al. | 713/157 |
| 2005/0187973 A1 * | 8/2005 | Brychell, III et al. | 707/100 |
| 2005/0193269 A1 | 9/2005 | Haswell et al. | 714/38 |
| 2005/0240621 A1 | 10/2005 | Robertson et al. | 707/102 |
| 2006/0064456 A1 * | 3/2006 | Kalthoff et al. | 709/201 |

FOREIGN PATENT DOCUMENTS

| | | |
|---|---|---|
| DE | 10049940 | 4/2002 |
| EP | 0 483 039 A2 | 4/1992 |
| EP | 0 520 923 A2 | 12/1992 |
| EP | 0 913 967 | 5/1999 |
| WO | WO 86/00735 | 1/1986 |
| WO | 01/37097 | 5/2001 |
| WO | 02/25471 | 3/2002 |
| WO | 02/25500 | 3/2002 |
| WO | 02/47463 | 6/2002 |
| WO | WO03/040865 | 5/2003 |
| WO | WO03/081371 | 10/2003 |
| WO | WO03/081372 | 10/2003 |
| WO | 03/093998 | 11/2003 |
| WO | WO2004/063955 | 7/2004 |
| WO | WO2004/072877 | 8/2004 |

OTHER PUBLICATIONS

Mannisto et al, "Modelling Configurable Products and Software Product Families", Software Configuration Workshop of ICSE01, Canada, May 2001.*

Crossland et al, "An Object-Oriented Modeling Framework for Representing Uncertainty in Early Variant Design", Research in Engineering Design 14, pp. 173-183, Oct. 14, 2003.*

Veron et al, "From CSP to Configuration Problems", From AAAI Technical Report WS-99-05, 1999.*

Sandhu et al, "Role-Based Access Control Models", Computer, Feb. 1996, vol. 29, Issue 2, pp. 38-47.*

Ferraiolo et al, "Role Based Access Control (RBAC): Features and Motivations", Proceedings of 11th Annual Computer Security Application Conference, pp. 241-248, Dec. 11-15, 1995, New Orleans, LA.* de Kleer, Johan, "An Assumption-based TMS," Artificial Intelligence 28:127-162 (1986).

Doyle, Jon, "A Truth Maintenance System," *Artificial Intelligence*, 12:231-272 (1979).

Haag, Albert, "Sales Configuration in Business Processes," IEEE Intelligent Systems, Jul./Aug. 1998, pp. 78-85.

Heinrich, M., et al, "A Resource-Based Paradigm for the Configuring of Technical Systems from Modular Components," Proceedings of the 7th IEEE Conference on Artificial Intelligence Applications (CAIA), pp. 257-264.

Juengst, Werner E., et al., "Using Resource Balancing to Configure Modular Systems," IEEE Intelligent Systems 13(4):50-58 (1998).

Denning et al, "Views for Multilevel Database Security," IEEE Transactions on Software Engineering, New York, NY, SE-13(4): 129-140.

Fernandez-Medina et al, "Specification of Security Constraint in UML," Security Technology, 2001 IEEE 35th International Conference, London, UK, 2001, pp. 163-171.

Hedin et al., "Product Configuration using Object Oriented Grammars," In Proceedings of the 8th International Symposium on System Configuration Management (SCM-8), Brussels, Jul. 20-21, 1998. LNCS-1439, Springer-Verlag, pp. 107-126.

Kim and Park, "The object-oriented modeling for product data management (PDM)," Computer Applications in Production Engineering, 1997, Chapman & Hall, pp. 33-46.

Peltonen et al., "Process-based view of product data management," Computers in Industry 31 (1996) pp. 195-203.

Raymond, "Authorization in Data Management Systems," Security Technology, 2001 IEEE 35th International Conference, London, UK, 2001, pp. 202-212.

Redlein, "Fulfilling Customer's Needs by The Use of a Variant Configuration for Dynamic Produce Definition," Proc. 7th IEEE International Conf. on Emerging technologies and Factory Automation, 1999, pp. 735-742.

Office Action from U.S. Appl. No. 10/291,175, dated Nov. 30, 2005, 10 pages; May 30, 2006 Response to Office Action dated Nov. 30, 2005, 20 pages.

Final Office Action from U.S. Appl. No. 10/291,175, dated Aug. 24, 2006, 8 pages; Jan. 24, 2007 Response to Office Action dated Aug. 24, 2005, 13 pages; Advisory Action, dated Feb. 14, 2007, 3 pages; Request for Continued Examination (RCE) dated Feb. 21, 2007, 14 pages.

Office Action from U.S. Appl. No. 10/291,175, dated May 4, 2007, 13 pages; Jul. 19, 2007 Response to Office Action dated May 4, 2007, 14 pages.

Final Office Action from U.S. Appl. No. 10/291,175, dated Oct. 5, 2007, 13 pages; Request for Continued Examination (RCE) filed Oct. 30, 2007, 15 pages.

Office Action from U.S. Appl. No. 10/291,175, dated Jan. 25, 2008, 13 pages; Apr. 25, 2008 Response to Office Action dated Jan. 25, 2008, 16 pages.

Final Office Action from U.S. Appl. No. 10/291,175, dated Jun. 19, 2008, 12 pages; Sep. 17, 2008 Response to Final Office Action dated Jun. 19, 2008, 14 pages; Advisory Action, dated Oct. 10, 2008, 3 pages; Request for Continued Examination (RCE) dated Nov. 26, 2008, 15 pages.

Office Action from U.S. Appl. No. 10/291,175, dated Jan. 27, 2009, 13 pages.

Apr. 27, 2009 Response to Office Action from U.S. Appl. No. 10/291,175, dated Jan. 27, 2009, 18 pages.

Office Action from U.S. Appl. No. 10/291,175, dated Jul. 21, 2009, 13 pages.

Response to Office action from U.S. Appl. No. 10/291,175, dated Oct. 21, 2009, 16 pages.

Bertino et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

Bon et al., "Sharing Product Data Among Heterogeneous Workflow Environments," CAD 2002: Corporate Engineering Research, German Informatics Society, Mar. 4-5, 2002, Dresden, Germany, XP002268575, pp. 1-10.

Chandramouli, "Application of XML Tools for Enterprise-Wide RBAC Implementation Tasks," Proceedings of the 5$^{th}$ ACM Workshop on Role-Based Access Control, Berlin, Germany, Jul. 26-27, 2000, XP000958089, pp. 11-18.

Choi et al., "Update Propagation of Replicated Data in Distributed Spatial Databases," Proceedings of Database and Expert Systems Applications: Tenth International Conference, Florence, Italy, Aug. 30, 1999—Sep. 2, 1999, DEXA '99(Lecture Notes in Computer Science vol. 1677), Berlin, Germany, Springer-Verlag, Germany, XP009022583, pp. 952-963.

Chou et al., "Versions and Change Notification in an Object-Oriented Database System," Proceedings of the Design Automation Conference, Anaheim, Jun. 12-15, 1988, Proceedings of the Design Automation Conference (DAC), New York, IEEE, US, vol. CONF. 25, Jun. 12, 1988, pp. 275-281, XP010013006, ISBN:0-8186-0864-1.

de Ferreira Rezende et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Hong et al., "Modeling of Version Relationaship for CAD Databases," Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita et al., "A Database Architecture and Version Control for Group Work," System Sciences, 1994, vol. III: Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Rana et al., "Version Support for Manufacturing Database Systems," International Conference on Industrial & Engineering Applications of Artificial Intelligence & Expert Systems, Tullahoma, IN, US, New York, NY, US, vol. 2, Jun. 6, 1989, pp. 779-784, XP000605772.

Chaudhuri et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm et al., "Data Cleaning: Problems and Current Approaches," IEEE Bullentin of thr Technical Committee on Data Engineering, vol. 23, No. 4, pp. 1-11, retrieved from the Internet Dec. 2000 at http://lips.informatik.uni-leipzig.de:80/pub/2000-45, XP002284896.

"SyncML Protocol, version 1.0," Internet Citation, Dec. 7, 2000, XP002217356, 60 pgs.

Haerder et al., "Integritactskontrolle," Datenbanken Konzeple und Techniken Der Implementierung, 1999, pp. 397-405, XP002294581 [translation provided].

Haerder et al., "RX-Sperrverfahren," Datenbanken Konzepte und Techniken Der Implementierung, 1999, pp. 419-420, XP002294552 [translation provided].

Anonymous "Data Profiling the Foundation for Data Management," *DataFlux Corporation*, Jul. 1, 2004, pp. 1-17.

Garcia et al. "Immunization Registries DeDuplication and Record Matching," *White Paper*, 1999, pp. 1-11.

Georgekopoulos and Hornick, "An Overview of Workflow Management: From Process Modeling to Workflow Automation Infrastructure," *Distributed and Parallel Databases*, 1995, vol. 3, No. 2, pp. 119-153.

Berndtsson et al., "Task Sharing Among Agents Using Reactive Rules, Cooperative Operation Systems," 1997, COOPIS '97, Proceedings of the Secomd IFCIS International, Jun. 24-27, 1997, pp. 56-65.

Hill et al., "Data Transformation: Key to Information Sharing," Gartner Group Startegic Analysis Report, Sep. 29, 1998 pp. 1-60.

Chan and Suwanda, "Designing Multinational Online Stores: Challenges, Implementation Techniques and Experience," IBM Centre for Advaced Studies Conference: *Proceedings of the 2000 conference of the Centre for Adavnced Studies on Collaborative research*, Mississauga, Ontario, Canada, 2000, pp. 1-14.

Sheth and Larson, "Federated Database Systems for Managing Distributed, Heterogenous, and Antonomous Databases," *ACM Computing Surveys*, 1990, 22(3): 184-236.

Baker et al., "An Obeject Model for Product and Workflow Data Management," Proceedings of the 9th International Workshop on Database and Expert Systems Applications at 731 (IEEE Computer Society, Aug. 26-28, 1998), 8 pages.

Bilgic and Rock, "Product Data Management System: State of the Art and the Future," *ASME Design Engineering Technical Conference*, 1997, 7 pages.

Hamer and Lepoeter, "Managing Design Data: The Five Dimensions of CAD Frameworks, Configuration Management, and Product Data Management," Proceedings of the IEEE, 1996, 84(1):42-56

Katz, "Toward a Unified Framework for Version Modeling in Engineering Databases," *ACM Computing Surveys*, 1990, 22(4):375-408.

Liu and Xu, "A review of web-based product data management systems," Computers in Industry, 2001, 44:251-262.

Conradi and Westfechtel, "Version Models for Software Configuration Management," ACM Computing Surveys, 1998, 30(2):232-282.

Tay and Gu, "Product modeling for conceptual design support," *Computers in Industry*, 2002, 49:143-155.

Theofanos and Pfleeger, "Wavefront: A Goal-Driven Requirements Process Model," *Information and Software Technology*, 1996, 38:507-519.

Urban et al., "Engineering Data Management: Achieving Integration Through Database Technology," Computing and Control Engineering J., 1993, pp. 119-126.

Gupta et al., "A Constraint Based Model of Coordination in Concurrent Design Projects," Proceedings of WET-ICE '96, 1996, 7 pages.

Final Office action from U.S. Appl. No. 10/291,175, dated Jan. 11, 2010, 12 pages; Advisory Action dated Mar. 18, 2010, 3 pages.

Office action from U.S. Appl. No. 10/307,905, dated Jun. 21, 2007, 13 pages; Response to Office Action, dated Sep. 21, 2007, 20 pages. Final office action from U.S. Appl. No. 10/307,905, dated Nov. 29, 2007; 13 pages; Response to office action, dated Jan. 29, 2008, 16 pages; Advisory Action dated Feb. 11, 2008, 3 pages; Responses to advisory action, dated Feb. 29, 2008, 16 pages; RCE dated Apr. 29, 2008, 83 pages.

Office action from U.S. Appl. No. 10/307,905, dated Jul. 15, 2008, 14 pages; Response to Office Action, dated Nov. 24, 2008, 17 pages.

Final office action from U.S. Appl. No. 10/307,905, dated Feb. 18, 2009, 12 pages; Response to office action, dated Apr. 17, 2009, 16 pages; Advisory Action dated Apr. 28, 2009, 3 pages; RCE: dated May 4, 2009, 2 pages.

Office action from U.S. Appl. No. 10/307,905, dated Jun. 15, 2009, 16 pages; Response to Office Action, dated Sep. 15, 2009, 19 pages.

Final office action from U.S. Appl. No. 10/307,905, dated Dec. 4, 2009, 18 pages; Response to office action, dated Feb. 2, 2010, 16 pages; Advisory Action dated Feb. 17, 2010, 3 pages; RCE dated Feb. 26, 2010, 1 page.

Office action from U.S. Appl. No. 10/331,154, dated Jul. 27, 2007, 15 pages; Response to office action, dated Nov. 27, 2007, 15 pages.

Final office action from U.S. Appl. No. 10/331,154, dated Feb. 21, 2008, 18 pages; Response to office action, dated Apr. 18, 2008, 20 pages; Advisory Action, dated May 1, 2008, 3 pages; RCE filed May 20, 2008, 1 page.

Office action from U.S. Appl. No. 10/331,154, dated Aug. 6, 2008, 19 pages; Response to office action, Dec. 4, 2008, 21 pages.

Final office action from U.S. Appl. No. 10/331,154, dated Mar. 17, 2009, 16 pages; Response to office action, dated May 18, 2009, 19 pages; Advisory Action, dated Jun. 1, 2009, 3 pages; RCE filed Jun. 16, 2009, 1 page.

Office action from U.S. Appl. No. 10/331,154, dated Sep. 17, 2009, 16 pages; Response to office action, dated Dec. 17, 2009, 19 pages.

Final office action from U.S. Appl. No. 10/331,154, dated Mar. 12, 2010, 19 pages.

Office action from U.S. Appl. No. 10/307,905, dated May 5, 2010, 17 pages.

RCE and Amendment and Response from U.S. Appl. No. 10/291,175, dated Apr. 12, 2010, 18 pages.

Cognos, "Constructing the Intergrated Data Warehouse with Cognos e-Applications: Designed for the enterprise, deployable by department," *Cognos*, 2000, 19 pages.

Froese, "Integrated Computer-Aided Project Managment Through Standard Object-Oriented Models," Dissertation, 1992, 284 pages.

Kim et al., ProQuest, "Componenent-based knowledge engineering architecture," Journal of Object-Oriented Programming, New York, 1999, 12(6):40, 21 pages.

Klenz, "The quality data warehouse: Serving the analytical needs of the manufacturing enterprise," Annual *Quality Congress Proceedings*, Milwaukee, 1999, p. 521, 8 pages.

McGrath, "Setting the PACE in Product Development," *Butterworth-Heinernann*, 1996, pages 1-176.

Modini, "The Role of Object-oriented Databases in Project Management," 1994, dspace.mit.edu, 101 pages.

International Preliminary Examination Report in Application No. PCT/IB02/05808, dated Jan. 27, 2004.

International Preliminary Report on Patentability and Written Opinion in Application No. PCT/EP2004/001320, dated Aug. 12, 2005.

Prosecution History of EP Application No. 02796931.0, as retrieved on Sep. 23, 2010.

Prosecution History of EP Application No. 04710378.3, as retrieved on Sep. 23, 2010.

Prosecution History of EP Application No. 03715254.3, as retrieved on Sep. 23, 2010.

Prosecution History of EP Application No. 03727748.0, as retrieved on Sep. 23, 2010.

Prosecution History of EP Application No. 03808336.6, as retrieved on Sep. 23, 2010.

Action and Response History in U.S. Appl. No. 10/291,175, as retrieved on Sep. 23, 2010.

Action and Response History in U.S. Appl. No. 10/366,627, as retrieved on Sep. 23, 2010.

Action and Response History in U.S. Appl. No. 10/307,905, as retrieved on Sep. 23, 2010.

Action and Response History in U.S. Appl. No. 10/328,761, as retrieved on Sep. 23, 2010.

Action and Response History in U.S. Appl. No. 10/331,154, as retrieved on Sep. 23, 2010.

Action and Response History in U.S. Appl. No. 09/577,268, as retrieved on Sep. 23, 2010.

Action and Response History in U.S. Appl. No. 09/643,207, as retrieved on Sep. 23, 2010.

Action and Response History in U.S. Appl. No. 09/643,316, as retrieved on Sep. 23, 2010.

* cited by examiner

| Characteristics | Characteristic Values |
|---|---|
| Exterior Color: | Red<br>Blue<br>Black |

| Characteristics | Characteristic Values |
|---|---|
| Sports Package: | Automatic Air, Leather Multifunctional, Sport Seats |

Basic View

| Characteristics | Characteristic Values |
|---|---|
| Exterior Color: | Red<br>Blue<br>Black<br>Green |
| Air Conditioning: | Manual Air Conditioning<br>Automatic Air Conditioning<br>*No* |
| Seat Heating: | Yes<br>*No* |
| Airbags: | *Driver*<br>Passenger<br>Side Curtain |
| Steering Wheel: | Leather Multifunction<br>Wood |
| Seats: | Sport Seats<br>*Standard* |

FIG. 4A

Engineering View

| Characteristics | Characteristic Values |
|---|---|
| Exterior Color: | Red<br>Blue<br>Black<br>Green |
| Air Conditioning: | Manual Air Conditioning<br>Automatic Air Conditioning<br>*No* |
| Seat Heating: | Yes<br>*No* |
| Airbags: | *Driver*<br>Passenger<br>Side Curtain |
| Steering Wheel: | Leather Multifunction<br>Wood |
| Seats: | Sport Seats<br>*Standard* |
| Battery: | Reinforced<br>Not Reinforced |

FIG. 4B

Marketing View

| Characteristics | Characteristic Values |
|---|---|
| Exterior Color: | Red<br>Blue<br>Black<br>Green |
| Air Conditioning: | Manual Air Conditioning<br>Automatic Air Conditioning<br>*No* |
| Seat Heating: | Yes<br>*No* |
| Airbags: | *Driver*<br>Passenger<br>Side Curtain |
| Steering Wheel: | Leather Multifunction<br>Wood |
| Seats: | Sport Seats<br>*Standard* |
| Constraints | |
| Constraint: If exterior color is black, then air conditioning is automatic air conditioning. | |

FIG. 4C

View for First Sales Process

| Characteristics | Characteristic Values |
| --- | --- |
| Exterior Color: | Red<br>Blue<br>Black |
| Air Conditioning: | Manual Air Conditioning<br>Automatic Air Conditioning<br>No |
| Seat Heating: | Yes<br>No |
| Airbags: | Driver<br>Passenger<br>Side Curtain |
| Steering Wheel: | Leather Multifunction<br>Wood |
| Seats: | Sport Seats<br>Standard |
| Constraints ||
| Constraint: If exterior color is black, then air conditioning is automatic air conditioning. ||

FIG. 4D

View for Second Sales Process

| Characteristics | Characteristic Values |
|---|---|
| Exterior Color: | Red<br>Blue<br>Black<br>Green |
| Air Conditioning: | Manual Air Conditioning<br>Automatic Air Conditioning<br>No |
| Airbags: | Driver<br>Passenger<br>Side Curtain |
| Steering Wheel: | Leather Multifunction<br>Wood |
| Seats: | Sport Seats<br>Standard |
| Sports Package: | Automatic Air, Leather Multifunctional, Sport Seats |

| Constraints |
|---|
| Constraint: If exterior color is black, then air conditioning is automatic air conditioning. |

FIG. 4E

VERSIONING OF ELEMENTS IN A CONFIGURATION MODEL

BACKGROUND

The present invention relates to data processing, and more particularly to product modeling.

Business enterprises can generally design, build, and sell one or more products such as, for example, a car. A product such as a car can be configurable. That is, the product can have characteristics that can be varied. For example, a characteristic of a car that can vary is the number of doors. The car can be a sedan or a coupe. There are other characteristics, such as engine size, wheel size, body color, and type of seats, which are configurable.

Business enterprises can use computer systems to facilitate operations such as product design. One example of such systems is a product modeling system. Generally, product modeling of a product refers to a process, usually implemented in a computer system, which defines a model that represents the product. Defining a configurable product can include, for example, specifying characteristics, characteristic values, constraints describing dependencies of the characteristics, default values, values ranges, and other parts of the product. These items can be specified in a configuration model. The configuration model is generally some collection of this information that is needed to configure the product. The configuration model can be an element of the overall product model. The parts of the product can be specified in a product structure that can also be an element of the overall product model.

The configuration model is generally the basis for configuring of a product. For example, the configuration model can include criteria that determine the configuration of the product. Criteria can include, for example, constraints specifying that a particular type of wheel must be used for a particular type of engine.

SUMMARY

The present invention provides methods and apparatus, including computer program products, for a multi-purpose configuration model.

In one implementation, a method for defining a configuration model for a configurable product by begins when a system receives a first input, and then defines, based on the first input, a first version of a first subcomponent to be used in the configuration model, the first version including information that describes the product. Next, the system receives a second input, and then defines, based on the second input, a second version of the first subcomponent to be used in the configuration model, the second version including information that describes the product. The system then designates one of the first or second versions to be an active version, and designates the other to be an inactive version. The system then defines, based at least in part on the active version of the first subcomponent, a first component that describes the product.

In another implementation, the system can include, as a child object of the active version of the first subcomponent, a second component, wherein the second component includes further information that describes the product and is in an active state. If the active version of the first subcomponent becomes inactive, then the second component changes to an inactive state. Similarly, the system can include, as a child object of the inactive version of the first subcomponent, a third component, wherein the third component includes further information that describes the product and is in an inactive state. If the inactive version of the first subcomponent becomes active, then the third component changes to an active state.

In yet another implementation, the first version can be active during a first promotional period, and the second version can be active during a second promotional period. Furthermore, the second version can be generated by updating the information within the first version.

BRIEF DESCRIPTION OF THE DRAWINGS

FIGS. 3A-E show examples of information included in components of the implementation.

FIGS. 4A-E show examples of views of the implementation.

Like reference numbers and designations in the various drawings indicate like elements.

DETAILED DESCRIPTION

Figure 1A:
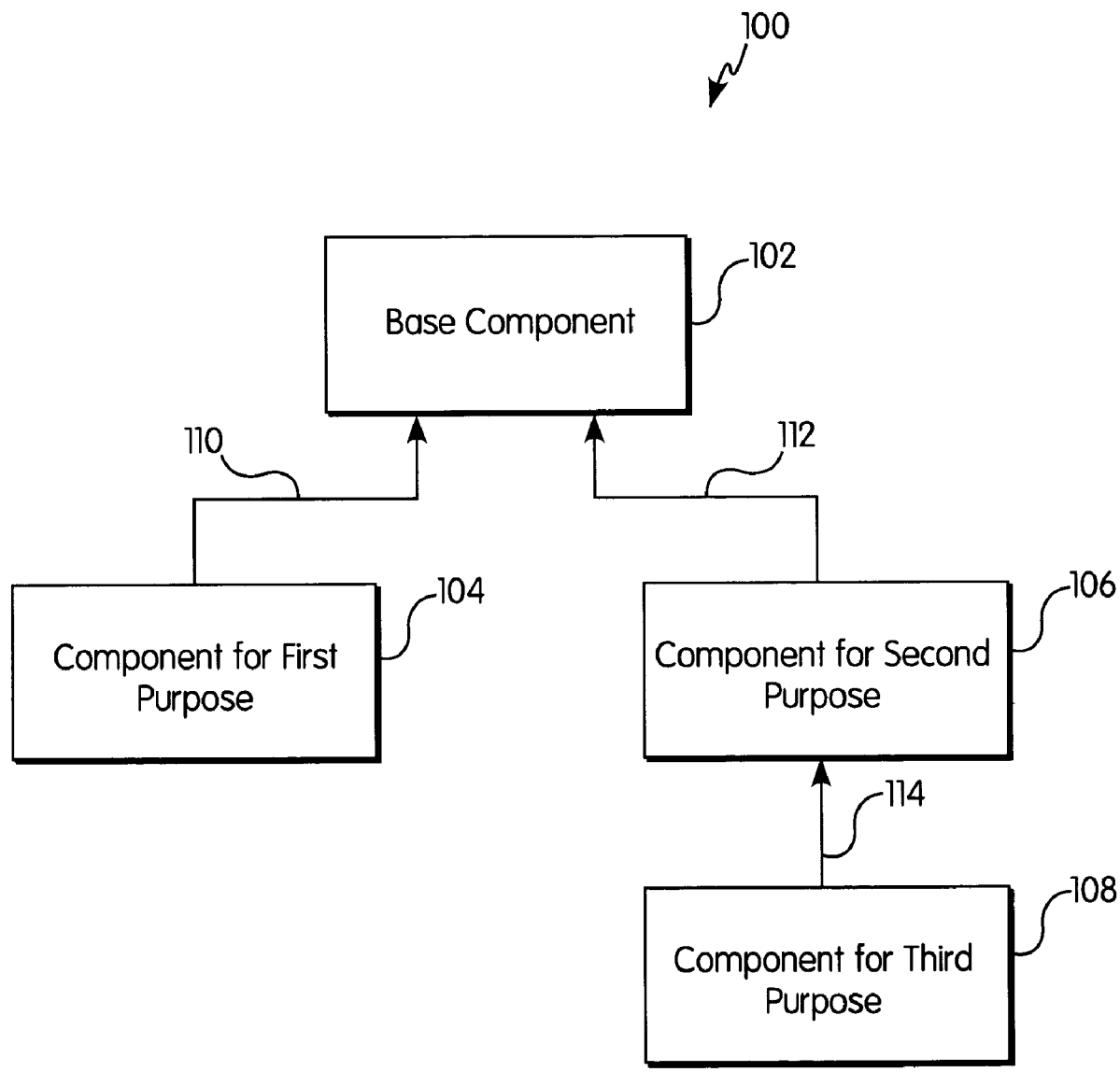
FIG. 1A shows a configuration model that includes different components.

FIG. 1A shows a configuration model 100 that describes a product. The model includes a base component 102, a component 104 for a first purpose, a component 106 for a second purpose, and a component 108 for a third purpose. Alternatively, other components can be included for other purposes. The configuration model can have only a single component.

Each component is formed from one or more subcomponents. Each subcomponent contains one or more elements used to define the configuration model, which can include but are not limited to characteristics of the product, characteristic values, constraints describing dependencies of the characteristics, default values, value ranges, prices of the product, costs of the product, classes, and other parts of the product.

The characteristics of the product refer to some aspect, such as "color", of the product. Characteristic values, such as "blue", specify the aspect. For example, blue specifies the color of the product. The constraints describe dependencies between or among characteristics. Constraints can also serve other functions. A system can, for example, determine whether an instance of a configuration model is consistent and complete. The instance is consistent if all constraints of the model are satisfied. The instance is complete if all required characteristics and elements of the configuration model are included. Constraints are further described below.

Price refers to a monetary value at which a product is sold. Cost refers to a monetary value at which the product or its components are built or procured.

A class, in this specification, refers to a collection of similar objects. Cars that have two doors, for example, can be grouped in a class called coupes. Cars that have four doors, for example, can be grouped in a class called sedans. Each component can include one or more classes. For example, a base component of a configuration model for a car can have two classes of cars, sedans and coupes. Sedans can inherit information from and add information to cars. Similarly, coupes can inherit information from and add information to cars.

The configuration model can include links such as the link 110, the link 112, and the link 114. The links, which can be pointers, associate parent object and child object components. For example, the link 110 associates the base component 102 and the component 104. Furthermore, the link 110 specifies that the component 104 is a child object of the base component 102. Links can also exist between two or more configuration models. This is described in more detail below.

Components and subcomponents can have multiple versions. A version is a particular storage state of the component or subcomponent. Documents, for example, can have different versions. The described links can associate versions of components or subcomponents. For example, the base component 102 and the component 104 can each have a first version and a second version, and the link 110 can associate the first versions of these components. The link can also associate a first version of one component with a second version of another component.

Figure 1B:
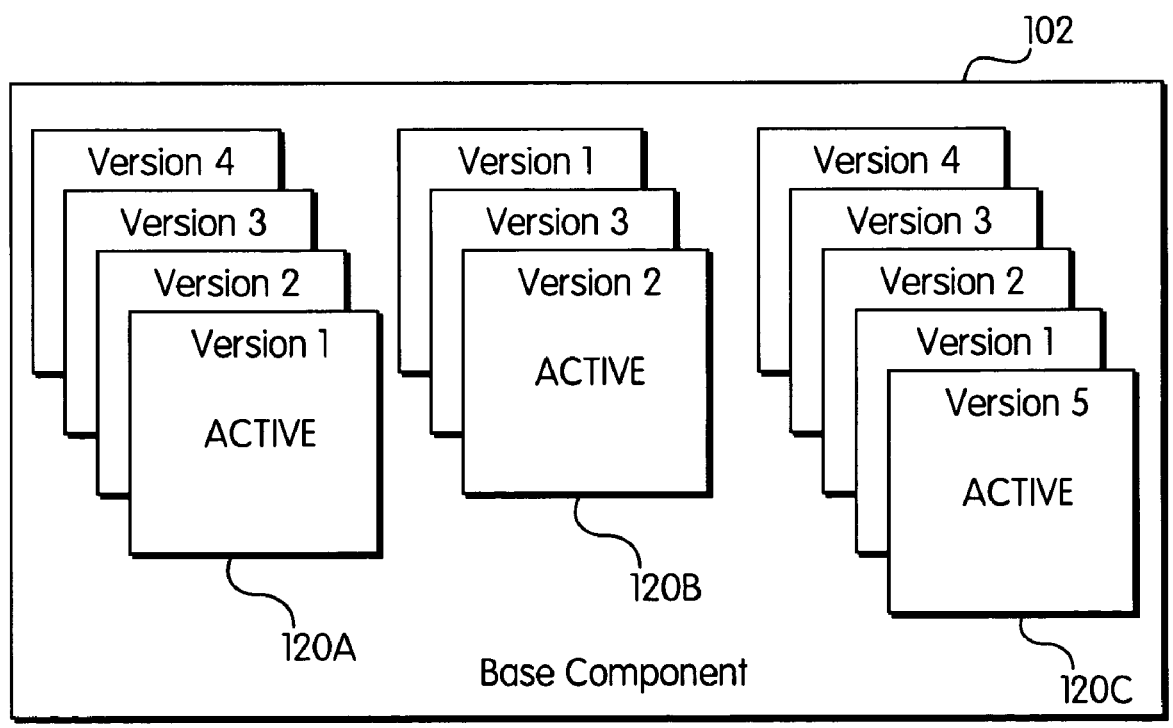
FIG. 1B shows a component formed by subcomponents having multiple versions.

The subcomponents used to build a particular component do not necessarily have the same number of versions. Each subcomponent can have its own set of versions, and one of these versions can be used in forming the component. An example is provided in FIG. 1B, where the base component 102 is formed from three different subcomponents 120A to 120C, each of the three subcomponents having its own set of versions. In FIG. 1B, subcomponent 120A has four versions, with version "1" currently being used to form base component 102. Subcomponent 120B has three versions, with version "2" currently being used to form base component 102. And subcomponent 120C has five versions, with version "5" currently being used in base component 102.

The particular version of a component or a subcomponent that is currently being used in the configuration model can be referred to as the "active" version, as shown in FIG. 1B, and the versions that are not currently in use can be referred to as "inactive" versions. There is no limit to the number of versions a component or a subcomponent can have.

Additional components or subcomponents can be linked to the active version of a component or subcomponent, or they can be linked to an inactive version of a component or subcomponent. Any additional components or subcomponents that are linked to an active component or subcomponent are active themselves. Likewise, any additional components or subcomponents that are linked to an inactive component or subcomponent are inactive themselves. If an inactive component or subcomponent becomes active, then any additional inactive components or subcomponents that are linked to it also become active.

Figure 1C:
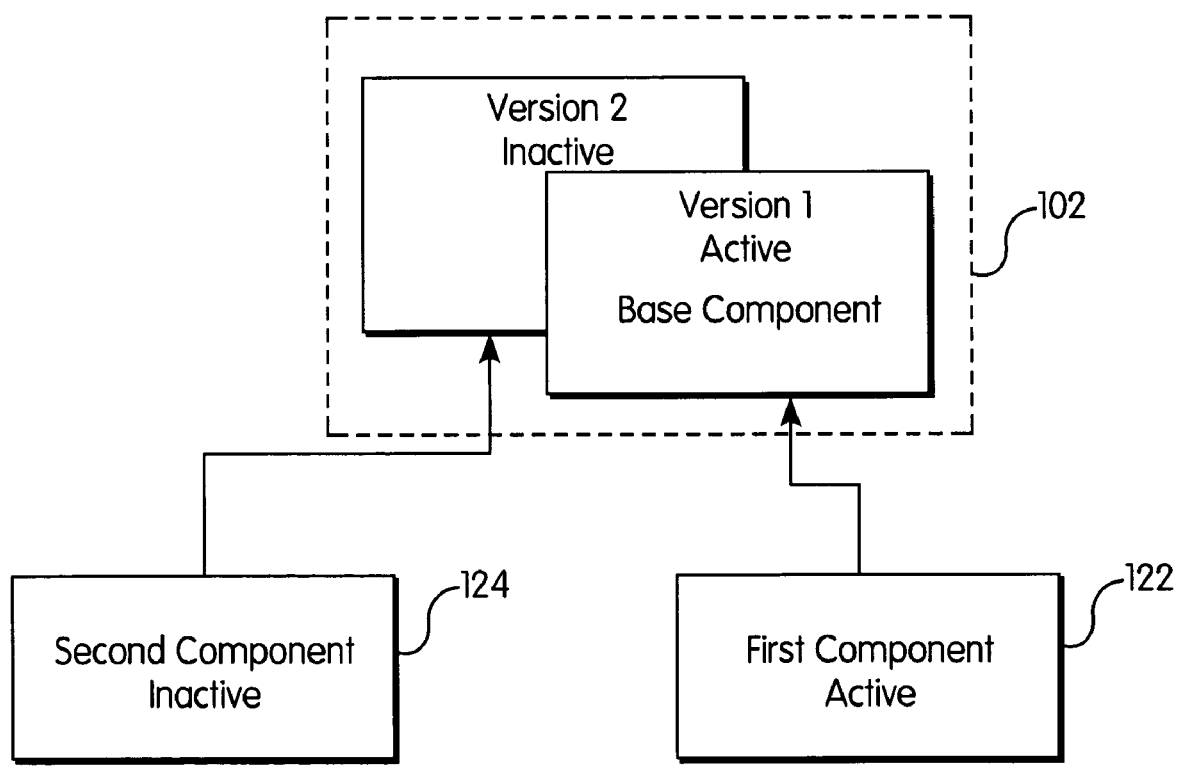
FIG. 1C shows components linked to different versions of a subcomponent.

FIG. 1C shows a base component 102 with multiple versions, where additional components are linked to different versions of the base component 102. A first component 122 is linked to an active version of the base component 102. The first component 122 is therefore active as well. A second component 124 is linked to an inactive version of the base component 102, and is therefore inactive as well. Whenever version "2" of the base component 102 becomes the active component, version "1" of the base component becomes inactive. As such, the second component 124 becomes active since it is linked to version "2", and the first component 122 becomes inactive since it is linked to version "1".

Versioning of components provides many advantages. Particular versions of a component can be generated for particular model configurations or selling seasons. For instance, different marketing components can be generated for normal sales periods and promotional sales periods. The use of versioning can also be advantageous when components are being updated. Often, it is not possible to take a component off-line in order to change the information contained within the component. In this situation, a different version can be generated that contains the new or updated information. Then this new version can reside in the configuration model as an inactive version. The inactive version can be tested and revised within the configuration model prior to making it the active version.

Child components can inherit from their respective parent components. That is, a child component can include all characteristics of the product, characteristic values, constraints, classes, prices of the product, and costs of the product. A child component generally further adapts the configuration model. For example, a child component, such as the component 108 can add one or more characteristics not included in a parent component, such as the component 106. The child component can also add one or more constraints to those of the parent component, as long as the new constraints do not contradict the constraints of the parent component. Each of the new constraints are generally added by means of one or more subcomponents that form the child component 106. The child component can set or change default values for characteristics included in the parent component. The child component can restrict ranges of characteristic values included in the parent component.

A purpose, in the context of the specification, can be a goal or task to be completed. A purpose can be, for example, the completion of some process, such as a business process. Business processes can include processes for product design, marketing, production, sales, engineering, and so forth. A purpose can further be a goal or task to be completed by a particular entity. For example, a purpose can be a sales process of a particular sales organization.

A system that defines the configuration model 100 can present different views of the configuration model 100 to a user. The different views can include different information, depending on the purpose and, hence, the component. For example, when there are no purposes specified, the system can present a view that includes only information included in the base component. For the first purpose, the system can present a second view that includes information included in the base component 102 and the component 104.

The system can also determine which information to present to a user based on whether the user has authorization to view or change information. That is, the system can determine, based on a user's role and authorization, which component of the configuration model to use.

Figure 2:
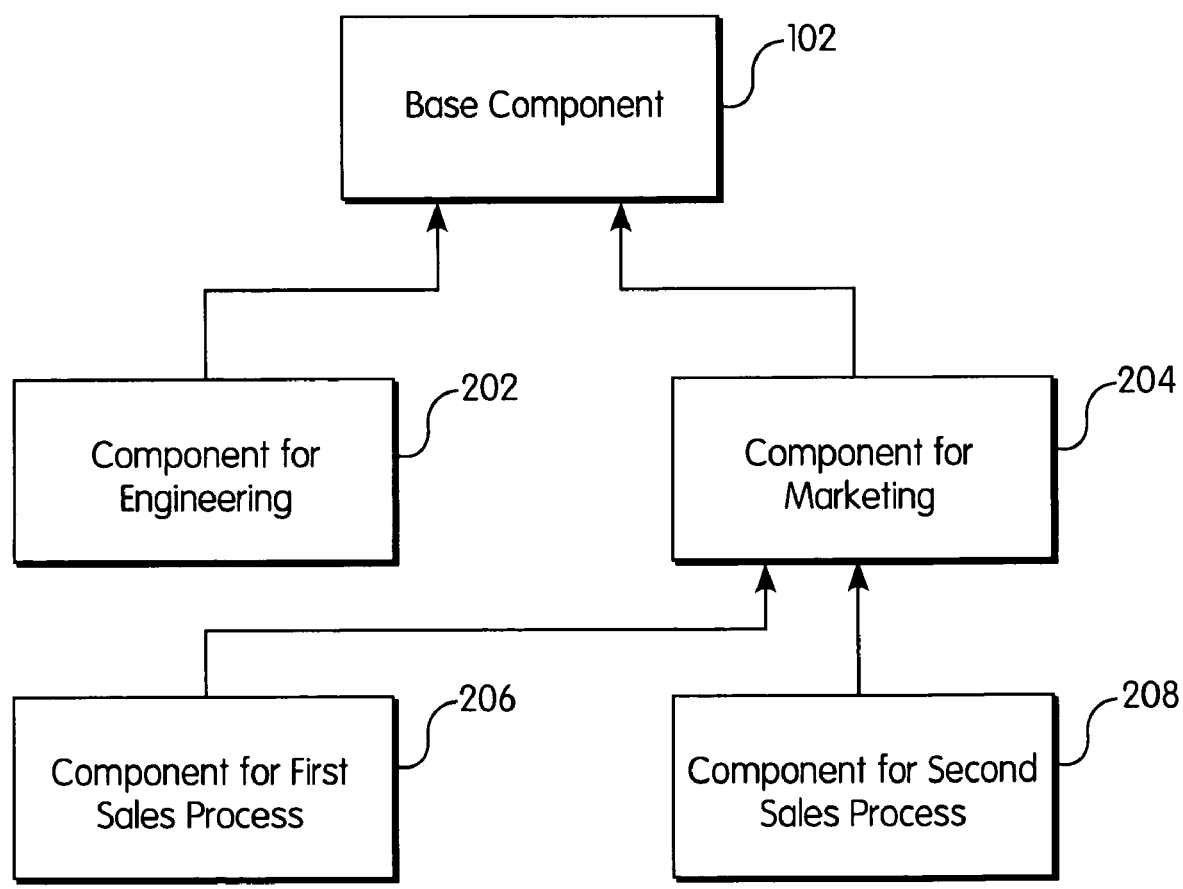
FIG. 2 shows an implementation of the configuration model.

FIG. 2 shows an implementation of the configuration model 100. The implementation includes the base component 102, a component for engineering 202, a component for marketing 204, a component 206 for a first sales process, and a component 208 for a second sales process. In this example, the first sales process can be one that is for northern Europe. The second sales process can be one that is for southern Europe. Alternatively, the implementation can further include a component for engineering, a component for a particular production plant, and a component for product design. The components can be implemented as subcomponents.

FIGS. 3A-E show examples of information included in the base component 102, the component for engineering 202, the component for marketing 204, the component 206 for the first sales process, and the component 208 for the second sales process. In the examples, the product is a car and the configuration model describes the car.

Figure 3A:
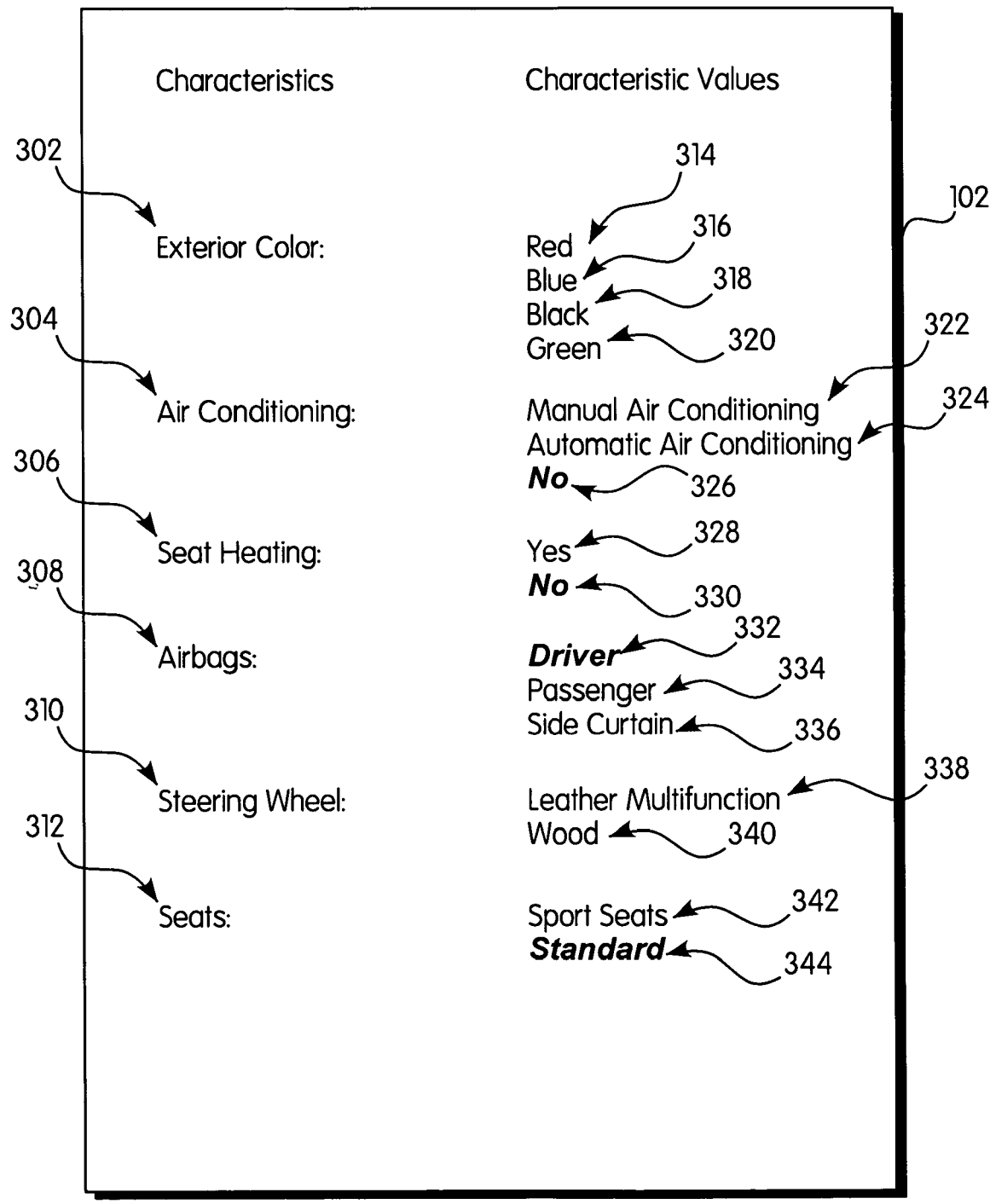

As shown in FIG. 3A, the basic component 102 includes characteristics and characteristic values. The characteristics include exterior color 302, air conditioning 304, seat heating 306, airbags 308, steering wheel 310, and seats 312. The characteristic values for color 302 include red 314, blue 316, black 318, and green 320. The characteristic values for air conditioning include manual air conditioning 322, automatic air conditioning 324, and no air conditioning 326. The characteristic value for seat heating include yes 328 and no 330. The characteristic values for airbags include driver 332, passenger 334, and side curtain 336. The characteristic values for steering wheel include leather multifunction 338 and wood 340. The characteristic values for seats include sport seats 342 and standard seats 344.

Each component can also describe default values. For example, the default value for air conditioning is no, the default value for seat heating is no, the default value for airbags is driver, and the default value of seats is standard. In one implementation, default values can be inherited but cannot be overwritten.

FIG. 4A shows an example view of base configuration model. The default values can be highlighted. A view of the base configuration model includes the above described characteristics and characteristic values.

Figure 3B:
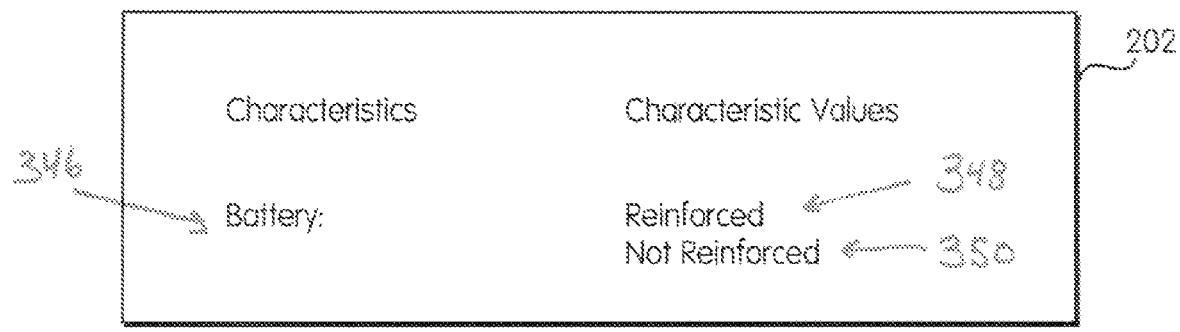

As shown in FIG. 3B, the engineering component 202 includes an additional characteristic, such as battery 346, and additional characteristic values, such as reinforced 348 and not reinforced 350.

FIG. 4B shows an example view of the configuration model for engineering. A view of the engineering configuration model includes the characteristics and characteristic values of the base component 102 as well as the characteristic and characteristic values of the engineering component 202.

Figure 3C:
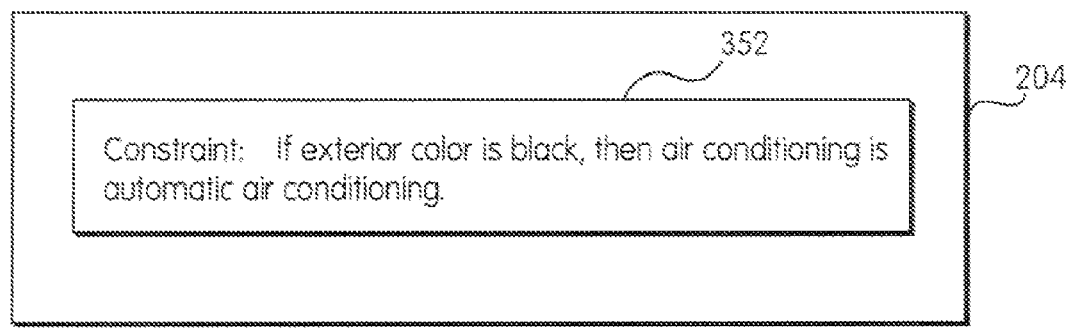

As shown in FIG. 3C, the marketing component 204 includes a constraint such as constraint 352. The constraint 352 specifies that there should be automatic air conditioning if the exterior color is black. FIG. 4C shows an example view of the configuration model for marketing. The view includes the characteristics and characteristic values included in the base component 102 and the constraint 352 included in the marketing component 204.

As shown in FIG. 3D, the component 206 for the first sales process has the same characteristics and constraint as the marketing component 204. However, the component 206 restricts the characteristic values for the exterior color. Specifically, the value green 320 has been excluded. FIG. 4D shows an example view of the configuration model for the first sales process.

As shown in FIG. 3E, the component 208 for the second sales process can include an additional characteristic, such as sports package 354, that has characteristic values of automatic air condition, leather multifunction, and sport seats. The default values of the component 208 are different from those described by the parent component, i.e., the marketing component 204. The default value for air conditioning is manual air instead of no, as is the case for the parent component. Some information, for instance the seat heating and its corresponding values, can be suppressed and, hence, are not shown in a corresponding view. Suppression hides but does not delete. FIG. 4E shows an example of the view of the configuration model for the second sales process.

Figure 5:
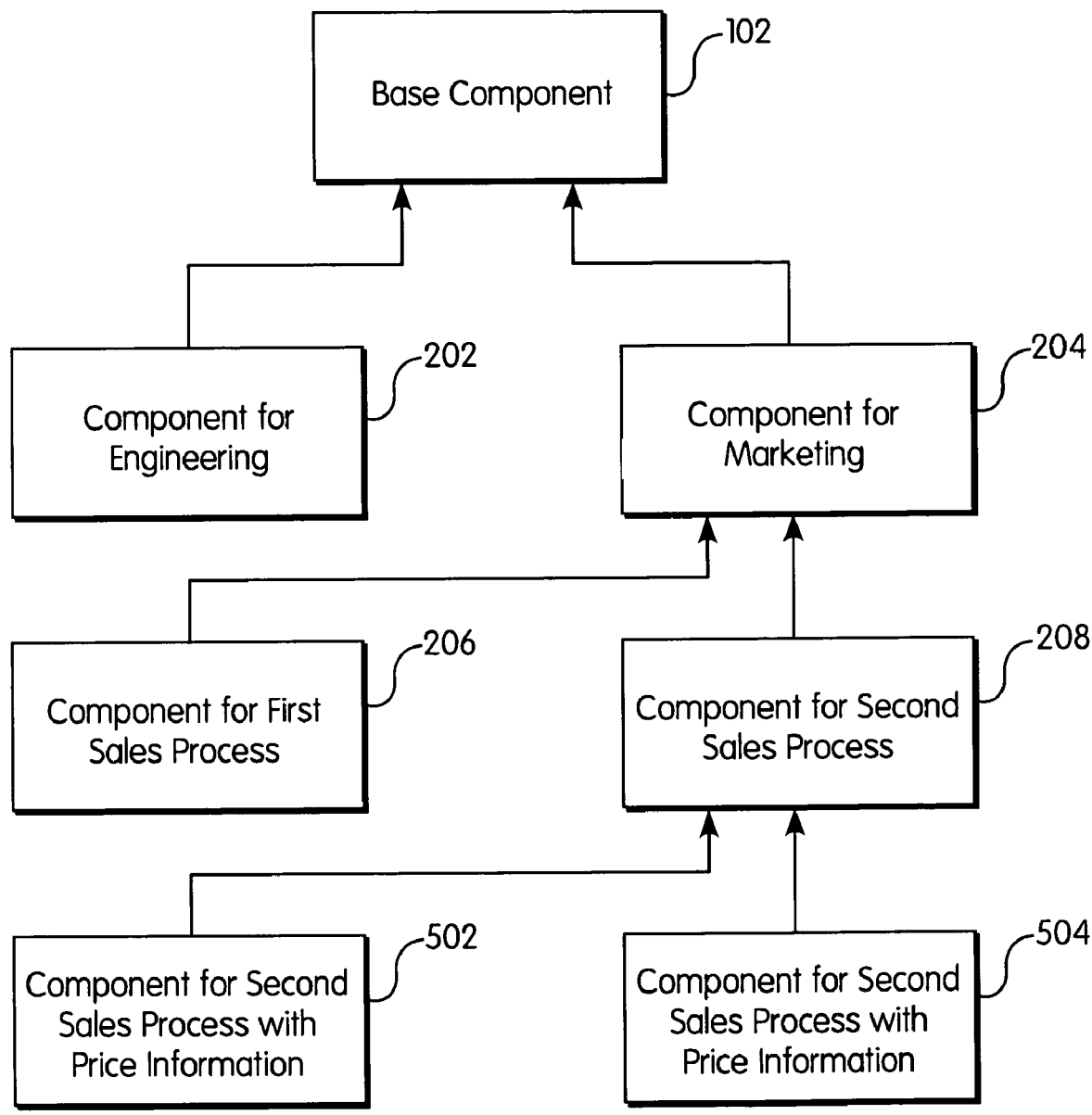
FIG. 5. illustrates role-based configuration modeling.

FIG. 5 shows another implementation of configuration model 100. In this implementation, the components can include information based on not only a business process but also on whether a user has authorization to access information. The implementation, for example, includes additional components 502 and 504 that include price information and, furthermore, which are only accessible to users having authority to view prices. Thus, users without authorization cannot access components 502 and 504 while users with authorization can access all components.

Figure 6:
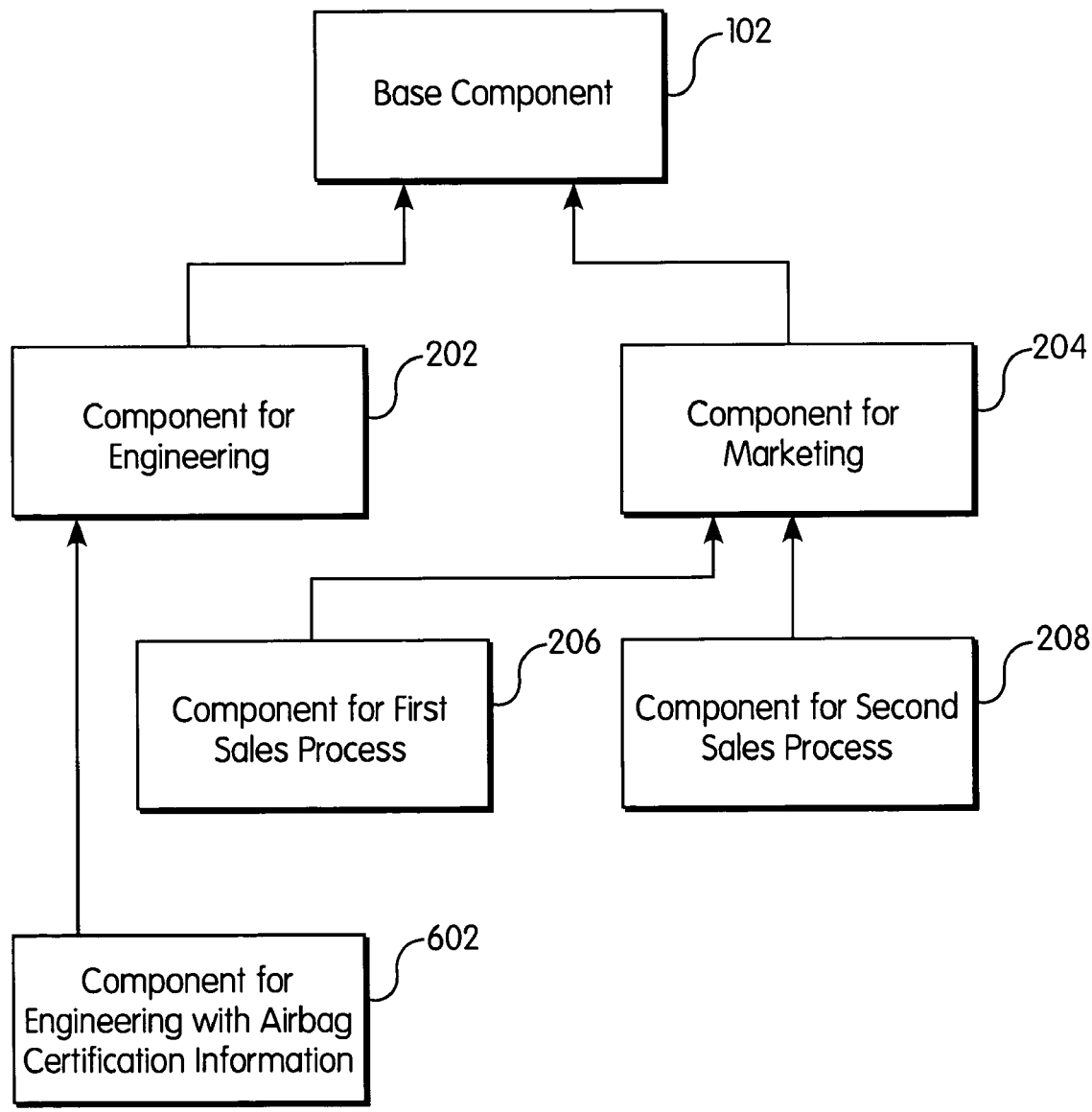
FIG. 6. illustrates access-authorization-based configuration modeling.

FIG. 6 shows another implementation of configuration model 100. In this implementation, the components can include information based not only on a business process but also on a role of the user. The implementation, for example, includes an additional component 602 that includes information about airbag certification. For users having a role that involves verifying airbags, the system presents information included in and inherited by the component 602. For users not having a role that involves certifying airbags, the system presents information inherited by and included in the component 202.

Figure 7:
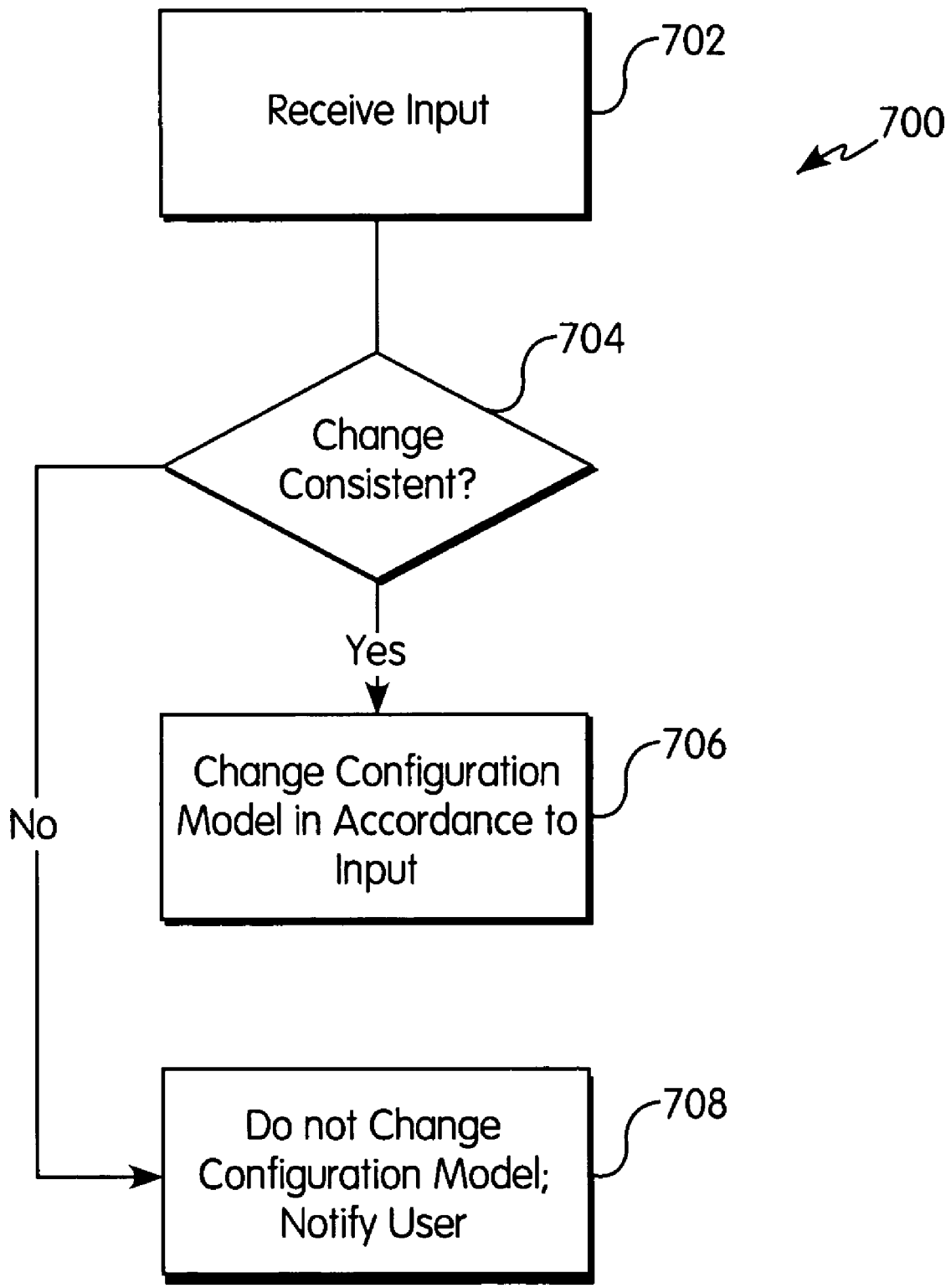
FIG. 7. shows a method for changing a configuration model.

FIG. 7 shows a method 700 for configuring a configuration model. As shown, the system receives input (step 702). The input can request the addition of a component, in which case the request specifies an existing component from which the new component will depend. Furthermore, the input can request actions such as adding characteristics, adding constraints, restricting ranges, and setting defaults, in which case the request specifies the component or components in which the change is to be made. The input can be from a user or other sources such as a computing system.

Optionally, the system can determine whether the source of the input is authorized to request the action specified in the request is permissible. If there is no authorization, the system can deny access. If the source is authorized for the action, the system can proceed. The system can deny access based on role, authorization, or both. The system can also deny access because an object to be changed has been locked or is being modified by a different component of the configuration model.

The system checks consistency (step 704). Checking consistency includes verifying that existing constraints, ranges, and default values inherited and included in a component being changed are not violated by the action requested by the input. If the action maintains consistency, then the system changes the configuration model in accordance to the input (step 706). Otherwise, the system does not make the change and notifies the user that the input cannot be processed (step 708).

Figure 8A:
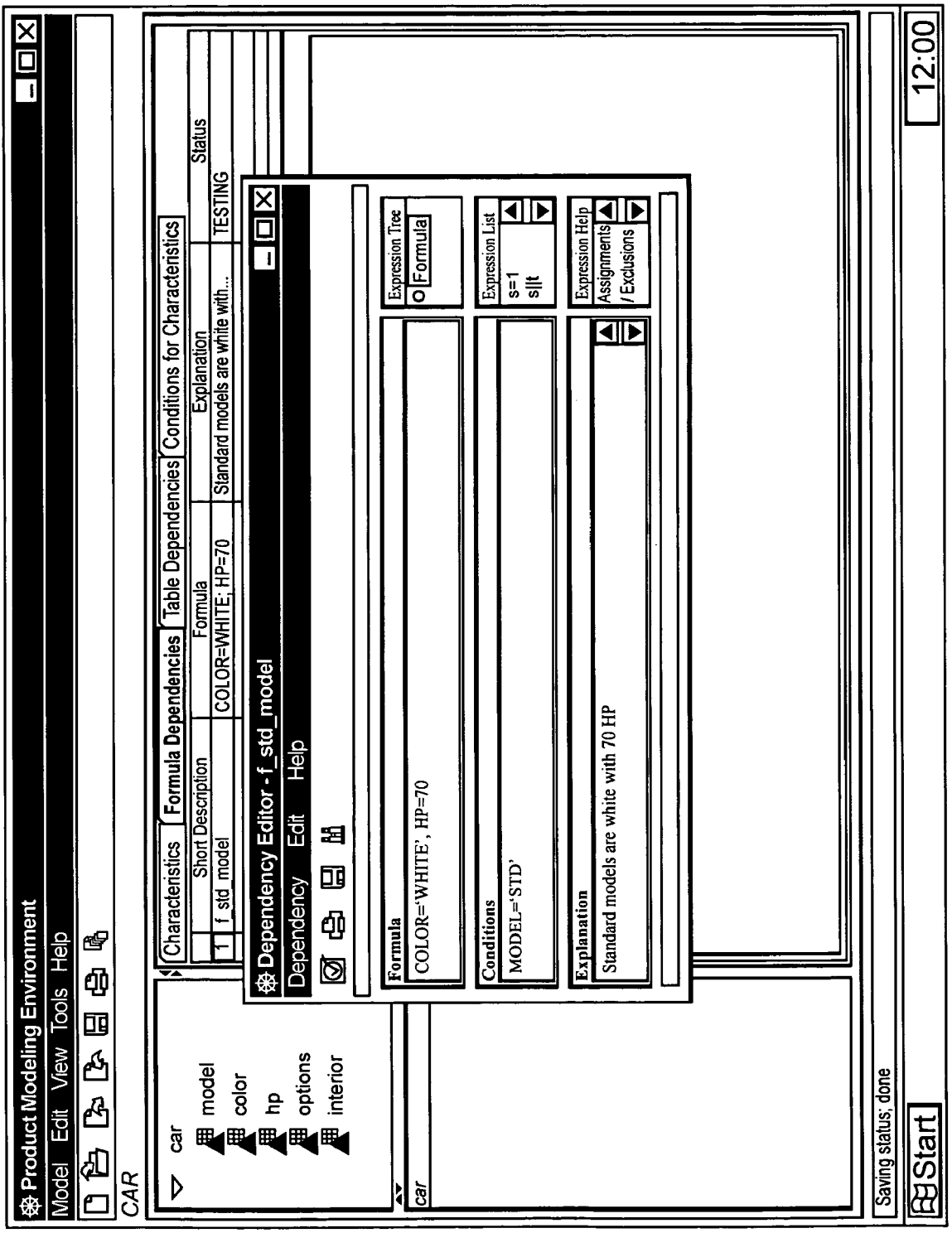
FIGS. 8A-C illustrates different techniques for defining constraints.
Figure 8B:
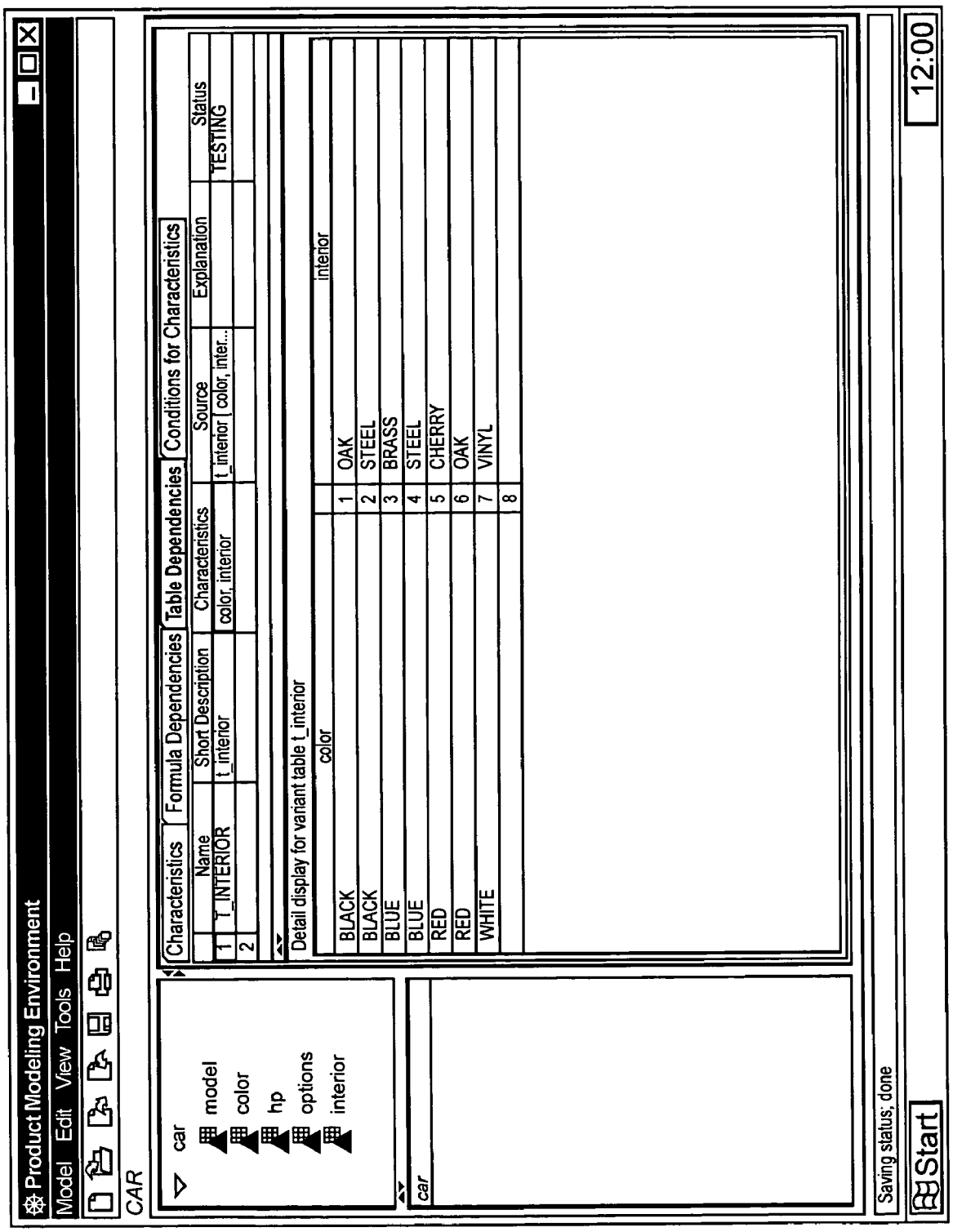
Figure 8C:
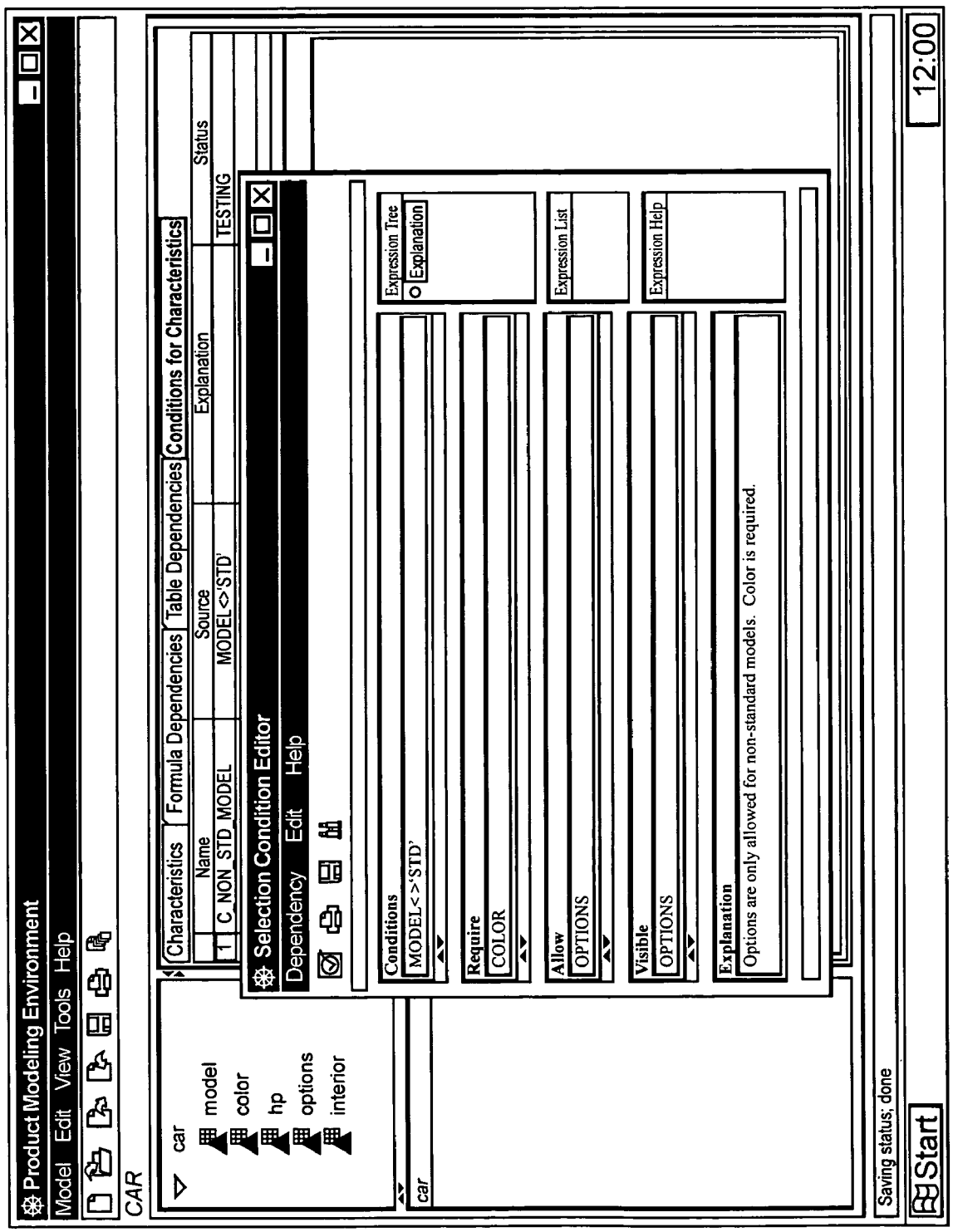

FIGS. 8A-C illustrates one implementation that includes three techniques for defining constraints (which are sometimes know as dependencies). The first technique uses formulas (also sometimes referred to as expressions). Generally, the formula is part of an IF-THEN statement. FIG. 8A shows a user interface that a user can use to define a constraint using the first technique. The user can enter into one window the IF (or the condition) part of the statement, which, in this example, is: if model is standard. The user can enter into another window the formula, which in this example, is: then color is white and horsepower is 70.

The second technique uses a table. As shown in FIG. 8B, the columns of the table can specify characteristics, such as colors and interior material, and the rows can specify characteristic values for the characteristics. Each row specifies a combination of characteristic values that is permissible. The table specifies all permissible combinations. For example, when exterior color is black, the interior material must be oak or steel.

The third technique uses conditions to specify which characteristics require characteristic values, which characteristics are allowed to have characteristic values, and which characteristics are shown in the configuration process. As shown in the example of FIG. 8C, when model is not standard, the characteristic called color is required and the characteristic called options is allowed and visible.

In one implementation, the configuration model includes: classes, characteristics, characteristic values, constraints, a product structure, configurable products, pricing information, estimated costs, and relationships between objects besides product structure. There can be more than one configuration model used in an enterprise. Typically, configuration models encompass similar products, such as all products in a product family.

The configuration model can be linked with a master data system of a hosting system where applicable. Certain characteristics and characteristic values can refer to global definitions in the master data system. For example, a characteristic listing the customer, business partner, or other business context information of the configuration model can be linked to corresponding business objects in the master data system.

In one implementation, the system can define a way for processes connected in a process chain to communicate with each other by stipulating that a configuration passed from one process to the next must be consistent and complete with respect to a common ancestor component model. This defining is referred to, in this specification, as process completion and requires action by both processes. The process that is handing off (i.e., the handing process) must remove characteristics and components that are not common to the common ancestor component model. The handing process may need to translate the stripped information into additional objects and characteristic value assignments at the level of the common ancestor component model. In the example of the car, a product sold in a particular sales region, e.g., a California Dune Buggy specified by fifteen characteristic values, may not directly correspond to a manufactured model. The properties specified when ordering one such car should, however, enable identification of the car as a manufacturable model TX500 specified by some fifty characteristic values (which are not relevant for sales, but which can be inferred from the original fifteen by the sales process).

The receiving process may have to augment the configuration by adding such characteristics and components from its own component model to allow useful processing. For example, the TX500 derived by sales process in the above example may need to be built in a manufacturing plant. The manufacturing process needs additional details (like battery size). This information may lead to some 200 characteristic values to be set that can be derived from the passed fifty characteristics.

In one implementation, several model component versions can be concurrently used operationally by the associated business process or entities. For example, cars can be ordered some time ahead of intended delivery. Cars to be delivered in April may need to be configured against a different model from those to be delivered in June. When creating a new version of a model component an explicit decision must be made to release the model for business use. To this end, each model component has a status. If changes need to be made for a model component that is in operational use, these changes must be tested before allowing them to become active. For this purpose, each model component has an active and an inactive state. The inactive state can be changed and tested without affecting the operational version. If the changes are approved, then the inactive state can be changed to an activate state.

In one implementation, model components are the units of distribution of a model. A central sales model may be distributed to all (non-central) sales organizations. Distributing a model component pre-supposes that the ancestor versions the component references either have already been distributed or are being distributed along with the model component.

In one implementation, the system can provide a mechanism for importing and exporting model component versions. A data container that allows storing and shipping the data in a component is provided. Changes to a model component version can be exported and imported by them. When importing a change to a model component that is in operational use, the change may have to be imported in a staged way. It is first imported into the inactive state and later activated.

In an implementation, components and subcomponents that have been defined in one configuration model can be reused in other configuration models. This is advantageous when two or more configurable products have configuration models that are independent of each other, but the configuration models have at least one subcomponent or component that contains the same information. For example, if the configurable product is a car, there may be two different car models that come with the same three engine choices. The configuration models for the two cars will be independent of one another, but both configuration models will need one or more subcomponents that contain the same engine information. Once a user generates the engine subcomponents for one configuration model, the second configuration model can simply reuse these subcomponents rather than creating brand new subcomponents.

The reuse of subcomponents can be implemented in different ways. In one implementation, the reuse of subcomponents can be implemented by establishing an inter-model link between subcomponents of a first configuration model and subcomponents of a second configuration model. The subcomponents being reused stay within the structure of the first configuration model, but can now be accessed by the second configuration model as well through the inter-model link. The inter-model link creates a communication path between the two configuration models. The second configuration model retrieves information out of the subcomponents being reused from the first configuration model. The inter-model link technique is possible when information can be exchanged between configuration models.

There are several advantages to using inter-model links when reusing subcomponents. The inter-model link can reduce the consumption of memory space because subcomponents being reused are stored in only one location. The use of an inter-model link enables the system to update subcomponent versions. When a newer version of a subcomponent is activated, the link can be rerouted to the newer version of the subcomponent, thereby updating all configuration models that are reusing a particular subcomponent. With the link, the system can check consistency and consequences of a change with respect to subcomponents belonging to other configuration models. Modeling responsibility can be distributed over multiple configuration models when subcomponents are being reused by inter-model links. Inter-model links also allow for abstract or generic subcomponents to be used in the configuration models without those subcomponents having to belong to any particular component or business process.

In another implementation, subcomponents or components can be copied from a first configuration model and then inserted into a second configuration model. The first configuration model can be an existing one and the second configuration can be a new one. Any number of subcomponents or components can be copied. The copy and insert method is advantageous when the configuration models are stored in different locations, such as on different computer systems or within different data systems. In particular, this method is advantageous when the configuration models are stored such that they are unable to communicate with one another. Each configuration model will then need its own independent copy of the subcomponents.

The copy and insert method of reusing subcomponents is also useful when the information within the subcomponents will be changed or modified beyond changes usually made between versions, and the change or modification is specific to the configuration model in which the subcomponents reside. When two or more configuration models directly share the same subcomponent, the data cannot be altered for the benefit of just one of the configuration models. Making configuration model specific modifications is only possible when each configuration model has its own copy of the subcomponents.

In another implementation, the reusable subcomponents can be stored in a location that is independent of any configuration model. The subcomponents can then be linked to each configuration model that needs to use it. This can be done when the user knows ahead of time that the information in the subcomponent will be used in multiple configuration models. The subcomponent can be defined in one location, and the configuration models can be linked to the subcomponent as needed. This allows multiple users to collaborate in the modeling process. In yet another implementation, the reusable location can be another location within the same configuration model. A link can be an intra-model link. That is, the link can then be established within the same configuration model so that multiple branches of the configuration model can use the same subcomponent.

The reuse of subcomponents can greatly reduce the time required to input data when generating a configuration model. This is because these subcomponents often contain large amounts of data, and therefore a lot of user hours can be expended in entering the data. This is particularly true when the subcomponents being reused form an entire component, thereby containing data for an entire business process. If a user is defining another configuration model that will have subcomponents that are identical to subcomponents in an existing configuration model, the reuse of these subcomponents will save the user from having to reenter all of the data once again.

The information that is shared by reusing subcomponents can be of any type. For example, if the marketing department is doing the same promotion for several different car models, the configuration models for each of those cars can use the same marketing subcomponents, including the same entire marketing component if necessary. A user can enter the marketing information into subcomponents for one configuration model, and those subcomponents can then be copied and inserted into the configuration models for other cars that are part of the promotion. Alternatively, the marketing subcomponents can be entered in the configuration model for one car, and those subcomponents can then be linked into the configuration models for the other cars. In another implementation, the marketing subcomponents can be stored outside of any particular configuration model, and then each of the configuration models that require the marketing subcomponents can be linked to it. Component types, including but not limited to product design, production, engineering, and sales, can be reused as well.

Figure 9:
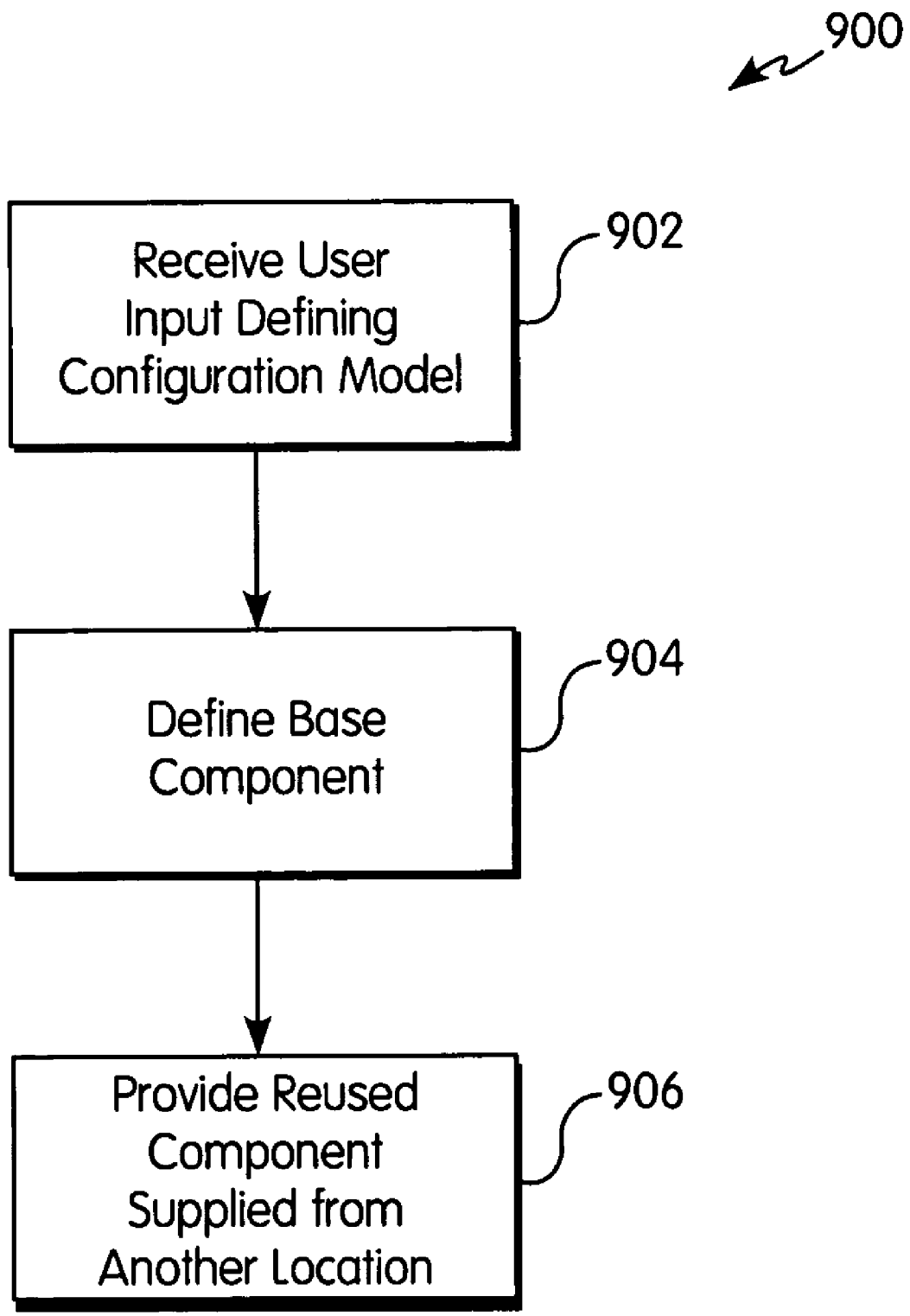
FIG. 9 shows a method for defining a configuration model by reusing subcomponents.

FIG. 9 shows one implementation of a method 900 for defining a first configuration model for a product by reusing subcomponents. Method 900 begins with receiving input from a user that is used in defining the first configuration model (step 902). The system then uses the input to define a first component of the first configuration model (step 904), where the first component includes information that describes the product. The first component can be a base component, as described above, or it can be any other type of component described herein, such as a component that is associated with a business process. The system then provides a reused subcomponent for the configuration model that was previously defined and supplied from another location (step 906), typically a second configuration model. The reused subcomponent includes further information that describes the product, and is implemented as a child object of the first component. As noted above, the reused subcomponent can be supplied by establishing a link between the first component and the reused subcomponent while the reused subcomponent is still located within the second configuration model. Alternatively, the reused subcomponent can be copied from the second configuration model and then added to the first configuration model as a child object of the first component.

One or more reused subcomponents can be joined with non-reused subcomponents to form a component of the first configuration model, or a component can be formed entirely from reused subcomponents. It should be noted that as above, the information that describes the product includes, but is not limited to, any combination of characteristics, characteristic values, constraints describing dependencies of the characteristics, default values, and values ranges. If the component is used for a business process, the business process can include, but is not limited to, one of marketing, product design, production, engineering, and sales.

Figure 10:
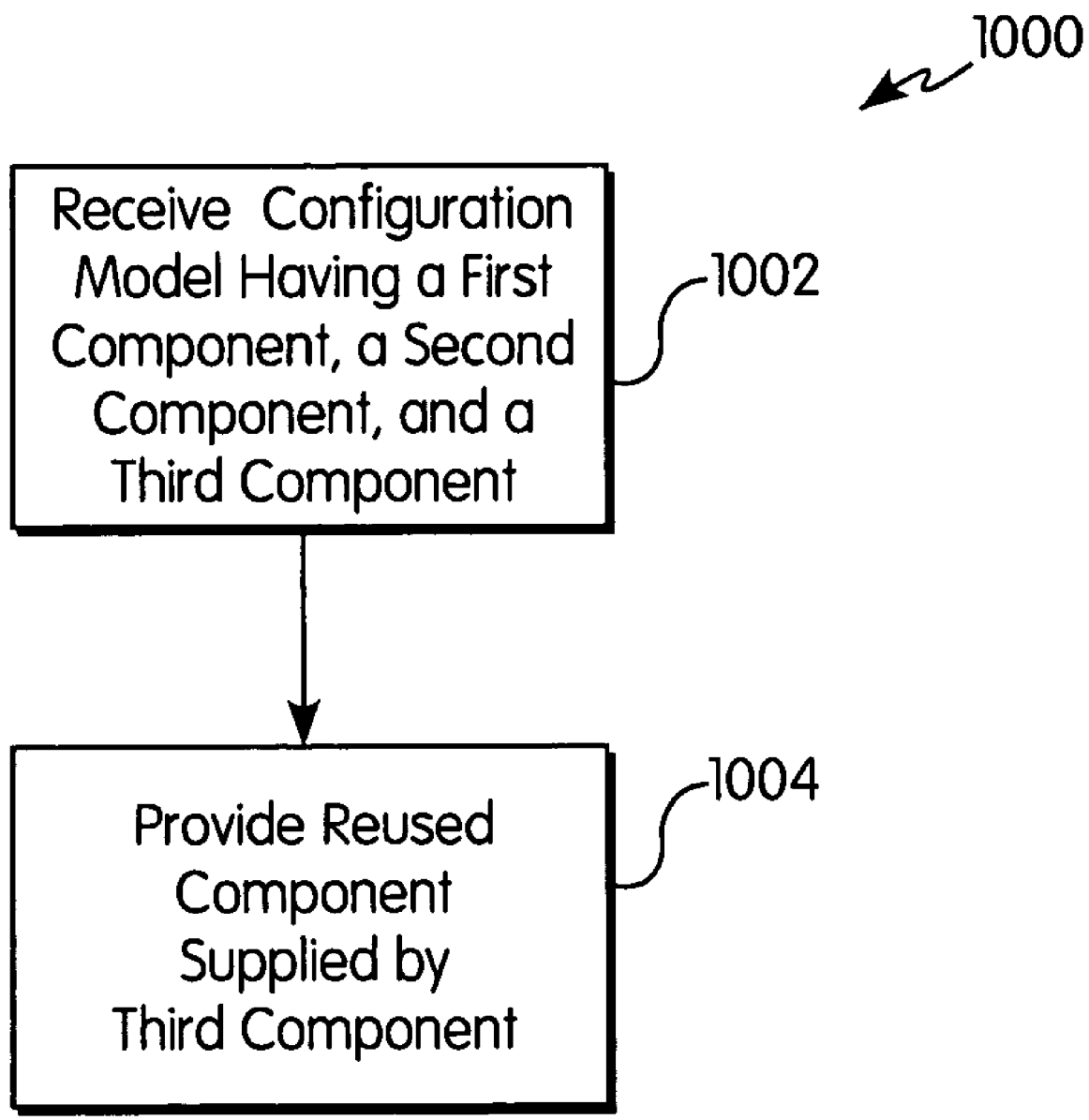
FIG. 10 shows another method for defining a configuration model by reusing subcomponents.

FIG. 10 shows an alternative implementation of a method 1000 for defining a configuration model for a product by reusing subcomponents. This implementation begins by receiving a configuration model that has a first component, a second component, and a first subcomponent (step 1002), where each component and subcomponent includes information that describes the product and can be associated with a business process, and where the first subcomponent is a child object of the second component. Next, the system provides a reused subcomponent as a child object of the first component, where the reused subcomponent is supplied by the first subcomponent (step 1004). The first subcomponent can be copied and then added to the configuration model as a child object of the first component, or a link can be established between the first subcomponent and the first component while the first subcomponent is still linked to the second component.

In one implementation, an abstract configuration model that generically describes a product can be defined. The abstract configuration model can include a generic base component. The abstract configuration model can include one or more components for a generic purpose. The generic components do not necessarily belong to a particular business process such as marketing or engineering. Rather, the generic components describe general objects that can be used in many different contexts. These generic components can be implemented in actual configuration models in a number of different ways.

In one implementation, the abstract configuration model is not associated with any particular product. Although the abstract configuration model is not associated with any particular product, it can be associated with a particular version if desired. Thus, an abstract configuration model can have multiple versions. The abstract configuration model can serve as a baseline for a particular product. The abstract configuration model can also be linked to other configuration models, including abstract and non-abstract configuration models.

The abstract configuration model can perform all of the same functions as a non-abstract configuration model. The system can generate a first view and a second view of the abstract configuration model. The first view can include information that generically describes the product. The second view can include information that generically describes the product for some generic process. The views can be based on the role or access authorization of the user, so that only information needed by the user is shown. The generic components can be used for any of the processes described above, including marketing, product design, production, engineering, and sales.

Figure 11:
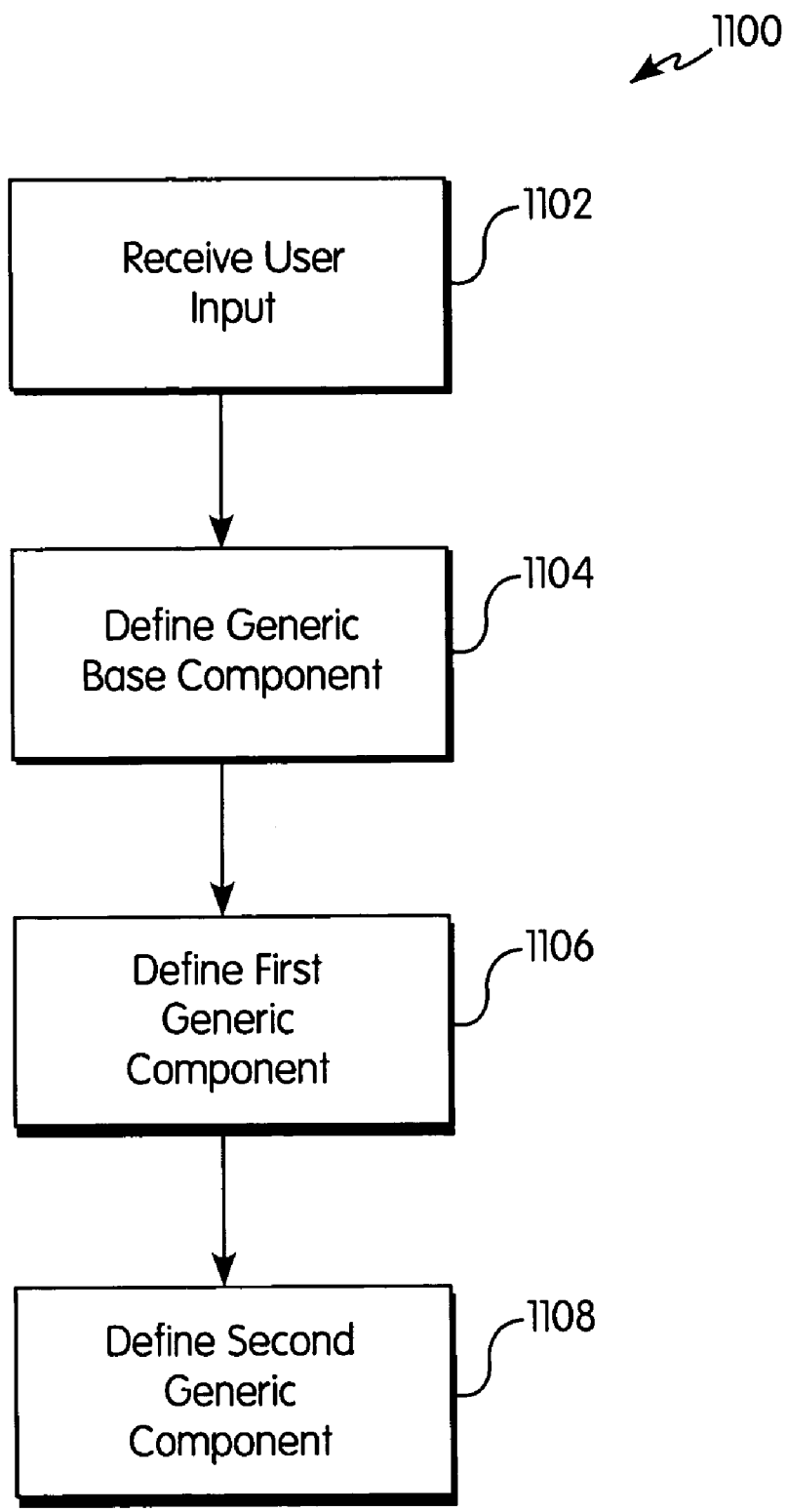
FIG. 11 shows a method for defining an abstract configuration model for a product.

FIG. 11 shows a method 1100 for defining an abstract configuration model for a product. This method 1100 begins by receiving an input from a user (step 1102). The system uses the input to define a generic base component of the configuration model, the generic base component including information that generically describes the product (step 1104). The system also defines, based on the input, a first generic component of the configuration model (step 1106). The first generic component includes information that generically describes the product and is associated with a generic business process. The system can then generate a first view of the abstract configuration model that includes information generically describing the product, and a second view generically describing the product and that is associated with a generic process. The system can also define, based on the input, a second generic component of the configuration model (step 1108), the second generic component including information which inclusion is based on a role of a user or on an access authorization.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a verification module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results. The configuration model can be applied to any product and is not limited to those described. For example, the configuration model can describe configurable computer systems. The configuration model can be adapted for purposes other than those listed. For example, the configuration model can be adapted for a business process for advertising. The system can be any computing system that includes programs having instructions to perform the described actions and operations. A product model can include subcomponents and components other than the described configuration model and the product structure. For example, a product model can also include documents, routing information, line design information, and material information. The system can use any technique for defining constraints and is not limited to using those described in reference to FIGS. 8A-C. using those described in reference to FIGS. 8A-C.

What is claimed is:

1. A computer-implemented method for defining a configuration model for a configurable product, comprising:

receiving, at a computer, a first input from a first source, the first input specifying one or more actions in connection with the configuration model;

determining whether the first source is authorized to request the one or more actions specified by the first input;

if the first source is determined to be authorized, defining, in the computer, based on the first input, a first version of a first subcomponent to be used in the configuration model, the first version describing at least a first characteristic of the first subcomponent;

defining, in the computer, a constraint belonging to the first subcomponent, the constraint defining a dependency between the first characteristic and a second characteristic of the first subcomponent;

receiving, at the computer, a second input;

defining, in computer, based on the second input, a second version of the first subcomponent to be used in the configuration model;

designating, in computer, the first version as an active version of the first subcomponent, and designating the second version as an inactive version of the first subcomponent;

defining, in the computer, based at least in part on the active version of the first subcomponent, an active version of a first component of the configurable product, wherein the active version of the first subcomponent is part of the active version of the first component;

automatically designating, in the computer, components linked to the active version of the first component as active components;

establishing, by the computer, a link between the configuration model and a second, different configuration model for accessing one or more components and subcomponents of the second, different configuration model;

generating, in the computer, the configuration model from the active components, the active version of the first component, and the one or more components and subcomponents of the second, different configuration model being accessed through the link;

determining, at the computer, a role of a user;

enabling the user to access the first component based on the role of the user;

verifying, in the computer, that the configuration model complies with the constraint; and providing, from the computer, the configuration model to one or more entities.

2. The method of claim 1, further comprising:

including, as a child object of the active version of the first subcomponent, a second component, wherein the second component includes further information that describes the configurable product and is in an active state.

3. The method of claim 2, wherein if the active version of the first subcomponent becomes inactive, then the second component changes to an inactive state.

4. The method of claim 1, further comprising:

including, as a child object of the inactive version of the first subcomponent, a third component, wherein the third component includes further information that describes the configurable product and is in an inactive state.

5. The method of claim 4, wherein if the inactive version of the first subcomponent becomes active, then the third component changes to an active state.

6. The method of claim 1, wherein the first version is active during a first promotional period, and the second version is active during a second promotional period.

7. The method of claim 1, wherein the second version is generated by updating the information within the first version.

8. The method of claim 7, wherein the second version is tested within the configuration model while it is in an inactive state.

9. The method of claim 1, wherein the first component comprises information that includes one or more of characteristics of the configurable product, characteristic values, constraints describing dependencies of the characteristics, default values, value ranges, prices of the configurable product, costs of the product, classes, and parts of the configurable product.

10. The method of claim 1, wherein the first version and the second version are associated with a business process, the business process comprising one of marketing, product design, production, engineering, and sales.

11. A computer program product, tangibly stored on a machine-readable medium, for defining a configuration model for a configurable product, comprising instructions operable to cause a programmable processor to:

receive a first input from a first source, the first input specifying one or more actions in connection with the configuration model;

determine whether the first source is authorized to request the one or more actions specified by the first input;

if the first source is determined to be authorized, define, based on the first input, a first version of a first subcomponent to be used in the configuration model, the first version describing at least a first characteristic of the first subcomponent;

define a constraint belonging to the first subcomponent, the constraint defining a dependency between the first characteristic and a second characteristic of the first subcomponent;

receive a second input;

define, based on the second input, a second version of the first subcomponent to be used in the configuration model;

designate the first version as an active version of the first subcomponent, and designate the second version as an inactive version of the first subcomponent;

define, based at least in part on the active version of the first subcomponent, an active version of a first component of the configurable product, wherein the active version of the first subcomponent is part of the active version of the first component;

automatically designate components linked to the active version of the first component as active components;

establish a link between the configuration model and a second, different configuration model for accessing one or more components and subcomponents of the second, different configuration model;

generate the configuration model from the active components, the active version of the first component, and the one or more components and subcomponents of the second, different configuration model being accessed through the link;

determine a role of a user;

enable the user to access the first component based in the role of the user;

verify that the configuration model complies with the constraint; and provide the configuration model to one or more entities.

12. The computer program product of claim 11, further comprising instructions operable to cause a programmable processor to:

include, as a child object of the active version of the first subcomponent, a second component, wherein the second component includes further information that describes the configurable product and is in an active state.

13. The computer program product of claim 12, wherein if the active version of the first subcomponent becomes inactive, then the second component changes to an inactive state.

14. The computer program product of claim 11, further comprising instructions operable to cause a programmable processor to:

include, as a child object of the inactive version of the first subcomponent, a third component, wherein the third component includes further information that describes the configurable product and is in an inactive state.

15. The computer program product of claim 14, wherein if the inactive version of the first subcomponent becomes active, then the third component changes to an active state.

16. The computer program product of claim 11, wherein the first version is active during a first promotional period, and the second version is active during a second promotional period.

17. The computer program product of claim 11, wherein the second version is generated by updating the information within the first version.

18. The computer program product of claim 17, wherein the second version is tested within the configuration model while it is in an inactive state.

19. The computer program product of claim 11, wherein the first component comprises information that includes one or more of characteristics of the configurable product, characteristic values, constraints describing dependencies of the characteristics, default values, value ranges, prices of the configurable product, costs of the product, classes, and parts of the configurable product.

20. The computer program product of claim 11, wherein the first version and the second version are associated with a business process, the business process comprising one of marketing, product design, production, engineering, and sales.

* * * * *